(12) United States Patent
Trainor

(10) Patent No.: US 12,361,474 B2
(45) Date of Patent: Jul. 15, 2025

(54) SYSTEM, NON-TRANSITORY COMPUTER READABLE MEDIUM, AND METHOD FOR INTEGRATING VOICE ASSISTANT DEVICE AND DIGITAL ASSISTANT DEVICE WITH CLOUD-BASED SERVICES

(71) Applicant: ORACLE INTERNATIONAL CORPORATION, Redwood Shores, CA (US)

(72) Inventor: Jarlath Trainor, Belfast (GB)

(73) Assignee: Oracle International Corporation, Redwood Shores, CA (US)

( * ) Notice: Subject to any disclaimer, the term of this patent is extended or adjusted under 35 U.S.C. 154(b) by 1172 days.

(21) Appl. No.: 17/038,233

(22) Filed: Sep. 30, 2020

(65) Prior Publication Data
US 2021/0272187 A1 Sep. 2, 2021

Related U.S. Application Data

(63) Continuation-in-part of application No. 16/806,531, filed on Mar. 2, 2020, now Pat. No. 11,615,097.

(51) Int. Cl.
*G06Q 30/00* (2023.01)
*G06Q 30/0601* (2023.01)
*G10L 15/22* (2006.01)

(52) U.S. Cl.
CPC ..... *G06Q 30/0641* (2013.01); *G06Q 30/0633* (2013.01); *G06Q 30/0639* (2013.01); *G10L 15/22* (2013.01); *G10L 2015/223* (2013.01)

(58) Field of Classification Search
CPC ........... G06Q 30/0641; G06Q 30/0633; G06Q 30/0639
USPC ........................................................ 705/27.1
See application file for complete search history.

(56) References Cited

U.S. PATENT DOCUMENTS

| | | | | |
|---|---|---|---|---|
| 10,521,189 B1 * | 12/2019 | Ryabov | ................. | G06F 40/117 |
| 11,087,751 B2 * | 8/2021 | Bhaya | ................. | G10L 15/1822 |
| 11,210,341 B1 * | 12/2021 | Bhagat | .............. | G06F 16/90335 |
| 11,861,674 B1 * | 1/2024 | Huang | ................... | G06V 20/00 |

(Continued)

OTHER PUBLICATIONS

Whang, C. (2018). Voice shopping: The effect of the consumer-voice assistant parasocial relationship on the consumer's perception and decision making (Order No. 10931970). Available from ProQuest Central; ProQuest Dissertations & Theses Global. (2130559314). Retrieved from https://www.proquest.com/dissertations-theses/voice-shopping-effect-consumer-assistant/docview/2130559314/se-2 (Year: 2018).*

(Continued)

*Primary Examiner* — Arielle E Weiner
(74) *Attorney, Agent, or Firm* — Kraguljac Law Group LLC

(57) ABSTRACT

Systems, methods, and other embodiments associated with processing audio requests between integrated devices are described. In one embodiment, the method includes receiving a voice request associated with a user interaction at a first device such as smart earbuds. Recognizing a signal based on the voice request by the user by a second device such as a smartphone. Utilizing the second device to interact with a web site. Using an on-line service associated with the web site to at least determine locations of items and forwarding information about a location of the item.

15 Claims, 17 Drawing Sheets

(56) References Cited

U.S. PATENT DOCUMENTS

| | | | |
|---|---|---|---|
| 2015/0106221 A1* | 4/2015 | Tapley | G06Q 30/0641 |
| | | | 705/27.1 |
| 2015/0167995 A1 | 6/2015 | Fadell | |
| 2016/0258762 A1* | 9/2016 | Taylor | H04W 4/33 |
| 2018/0101195 A1 | 4/2018 | Meriaz | |
| 2019/0005569 A1* | 1/2019 | Kotha | G06F 16/29 |
| 2019/0251417 A1 | 8/2019 | Bennett | |
| 2020/0160321 A1* | 5/2020 | Arzumanyan | H04W 4/12 |
| 2020/0175154 A1* | 6/2020 | Ratnakaram | G06F 21/54 |
| 2020/0285568 A1 | 9/2020 | Alff | |
| 2020/0302423 A1* | 9/2020 | Vijayaraghavan | G06Q 20/322 |
| 2020/0395007 A1 | 12/2020 | Cheng | |
| 2021/0026913 A1 | 1/2021 | Grubb | |

OTHER PUBLICATIONS

Amazon; techdoc; 1 pg. downloaded Sep. 28, 2020 from https://developer.amazon.com/en-GB/alexa/techdoc-template.

Rohit Dhamija, Adding Alexa as a Conversation Channel to your Oracle Digital Assistant Chatbot, Oracle Digital Assitant Tech Exchange Article, Nov. 2018, pp. 1-25, Oracle.

Kadday Oucif, Building Data-Driven Applications with Oracle Cloud Database, Oracle Rest Data Services and Oracle Digital Assistant, Oracle Digital Assistant TechExchange Article, Jan. 2020, pp. 1-23, Oracle.

Jay Atkinson, Defining Headless Commerce, Jul. 8, 2019, pp. 1-5, Oracle, downloaded from: https://blogs.oracle.com/cx/defining-headless-commerce.

Anshuman Panda, Adding Google Assistant as a Conversation Channel to your Oracle Digital Assistant Chatbot, Oracle Digital Assistant TechExchange Article, Sep. 2019, pp. 1-14, Oracle.

Oracle, Integrating Oracle Commerce Cloud and Oracle Retail Order Management System, Nov. 2019, pp. 1-23, Oracle.

Chris Welch, Amazon Echo Buds Review: Great Sound at the Right Price, Oct. 29, 2019, pp. 1-14. Downloaded from: https://www.theverge.com/2019/10/29/20937559/amazon-echo-buds-wireless-earbuds-review-features-bosenoise-reduction-price.

Ziff Davis, LLC. PCmag Digital Group, How to Send-Receive Messages on Amazon Echo, pp. 1-7, downloaded on Sep. 28, 2020 from: https://www.pcmag.com/how-to/how-to-send-receive-messages-on-amazon-echo.

Kim et al. "Efficient Large-Scale Neural Domain Classification with Personalized Attention"; Proceedings of the 56th Annual Meeting of the Association for Computational Linguistics (vol. 1: Long Papers), 2018, pp. 1-11.

Gebhart "How to Bring Alexa Into Every Room of Your Home", CNet, Feb. 2, 2017, https://www.cnet.com/home/smart-home/how-to-install-alexa-in-every-room-of-your-home, 2017, pp. 1-11.

Nield How to Use Amazon Alexa and Google Assistant From a Computer, Gizmodo, May 23, 2017; https://gizmodo.com/how-to-use-amazon-alexa-and-google-assistant-from-a-com-1795289722, 2017, pp. 1-30.

Dhamija Adding Alexa as a Conversation Channel to your Oracle Digital Assistant Chatbot, Nov. 2018, pp. 1-25.

Uliyar "A Primer: Oracle Intelligent Bots", Powered by artificial intelligence, White Paper, Sep. 2017, pp. 1-28.

* cited by examiner

SYSTEM, NON-TRANSITORY COMPUTER READABLE MEDIUM, AND METHOD FOR INTEGRATING VOICE ASSISTANT DEVICE AND DIGITAL ASSISTANT DEVICE WITH CLOUD-BASED SERVICES

CROSS-REFERENCE TO RELATED APPLICATIONS

This disclosure is a continuation-in-part of U.S. Non-Provisional patent application Ser. No. 16/806,531, filed on Mar. 2, 2020, titled "Triggering a User Interaction with a Device Based on a Detected Signal", and assigned to the present assignee, the disclosure of which is hereby incorporated by reference in its entirety.

BACKGROUND

The number of wireless user devices has grown in recent years, and users are interacting with different user devices to accomplish various tasks through a variety of multi-experiences. This diversity of wireless user devices presents an opportunity to interact with a user in different mediums. For example, a smart earbud device (or a hearable) can be used by a user to interact with other user devices such as a smartphone. This effectively provides a hands-free, smart-speaker in the ear while the user is moving around anywhere such as indoors or outdoors/away from home Consequently, it would be desirable to utilize the smart earbud device in conjunction with other user devices such as smartphones in order to assist the user to interact with other services. Techniques that successfully leverage this type of interaction between the smart earbuds and the other user devices such as smartphones can be advantageous.

SUMMARY

The embodiments of the present disclosure are generally directed to systems and methods for integrating voice assistant device and digital assistant device with cloud-based services. In one embodiment, audio voice commands are detected, translated, and communicated between multiple devices. A voice request associated with a user interaction can be received from the user at a first device such that the voice request is associated with determining a location of a desired item in a retail store and purchasing the desired item from the retail store. In one embodiment, the present system can be configured as a personalized audio-assisted shopping system. A signal can be recognized based on the received voice request by the user. A second device can be configured to interact with the user based on the recognized voice request. The second device is utilized to locate the retail store associated with the desired item, wherein the second device interacts with a web site associated with the retail store. In response to the second device interacting with the web site associated with the retail store, a determination is made regarding if the retail store is currently selling the desired item. The location of an item in the retail store is then forwarded from the web site through the second device to a user interface associate with the second device for presentation to the user. The user interface is used to verify that that the item in the retail store is correct by receiving an input from the user. Upon confirming that the item in the retail store is correct, a transaction can be initiated and completed to purchase the confirmed item in the retail store. In this manner, the user can initiate and complete electronic transactions via network services in a contactless, expedited way so that the user can avoid human contact especially during times when social distancing is recommended.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Embodiments trigger a user interaction with a first client device based on a detected signal. For example, a user can initiate an interaction with a digital assistant, such as through a text-based chat channel or a conversational channel, or a user can interact with a webpage, web application, or any other suitable web presence (e.g., a web channel interaction). Also, the user can interact with a wireless earbud device such as an Amazon (Echo Buds), Apple (AirPods), Google (Pixel Buds) or Samsung (Galaxy Buds). Based on this interaction, a signal can be detected by embodiments, such as through the use of machine learning, rules, or other techniques. For example, through a chat or conversation with the user, a chatbot can identify a signal in the user interaction, or a configured server can identify a signal in a user's web actions. In some embodiments, the signal can indicate a user's interest in purchasing a product or service.

In some embodiments, based on the user's interactions on a first client device and one or more detected signals, a second user device can be configured to interact with the user in a different channel. For example, a signal identified for a text-based chat interaction on first user device (e.g., smartphone or smart earbuds) can be used to trigger interaction with the user on a tablet or smartphone (e.g., a display-based interaction) or using a smart speaker (e.g., conversational interaction). In another example, a signal identified in a user's web actions using a first user device (e.g., tablet) can be used to trigger a text or dialogue-based interaction (e.g., on a separate client device, such as a smartphone) or an interaction using a smart speaker (e.g., conversational voice interaction).

Embodiments can trigger user interaction on a separate client device in a different channel to improve user experience. For example, some users may prefer having certain interactions on certain devices (e.g., selecting from a list of service options on a tablet rather than a smartphone, navigating a menu based on a conversation with a smart speaker rather than a text-based chat on a smartphone or tablet, and the like). Embodiments leverage the proliferation of client devices to interact with users in a preferred manner, and thus improve the user experience.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
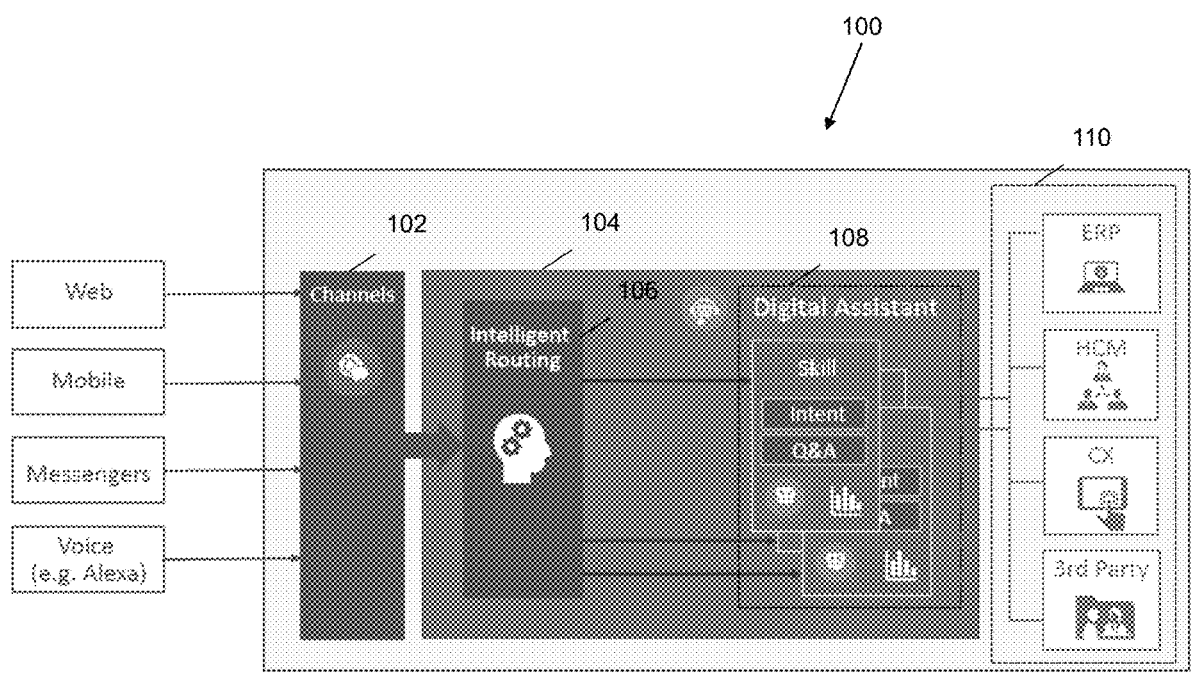
FIG. 1 illustrates a system for triggering a user interaction with a device based on a detected signal, according to an example embodiment.

FIG. 1 illustrates a system for triggering a user interaction with a device based on a detected signal, according to an example embodiment. System 100 includes channels 102, server 104, routing 106, digital assistant 108, and end components 110. In some embodiments, channels 102 can include a web channel (e.g., website or web application interaction using a client device, such as a laptop or desktop), a mobile channel (e.g., website, web application, or native application interaction using a client device, such as a smartphone or tablet), a messenger channel (e.g., messaging such as short message service ("SMS"), WhatsApp, FB Messenger, Slack, iMessage, and the like), or voice (e.g., smart speaker interaction, smart earbuds interaction, or another digital assistant interaction). Any other suitable channels can be implemented.

Server 104 can interact with the user (e.g., using one or more client devices) through channels 102. Server 104 can include routing 106, which can intelligently route traffic (e.g., that includes user interaction data in a given channel) to one or more instances of digital assistant 108. For example, digital assistant 108 can include a number of skills. In some embodiments, skills can be considered chatbots (or a similar configurable chat enabled software element) that are configured to accomplish specific tasks. For example, digital assistant 108 and a configured skill can be used to detect one or more user intents based on interactions with the user. In some embodiments, routing 106 intelligently routes traffic to one or more configured skills of digital assistant 108.

In some embodiments, digital assistant 108 can achieve interaction between a user and one or more end components 110. For example, end components 110 can include enterprise resource planning software, human capital management software, customer service software, or any other suitable third-party software. Digital assistant 108 can include skills configured to interact with a number of end components 110.

In some embodiments, digital assistant 108 can be software that uses artificial intelligence and machine learning to combine independent chatbots into a single conversational interface that assists real users throughout their day. Oracle® Digital Assistant (ODA) manages and coordinates multiple smaller-scoped skill bots to a composite chatbot solution that assists users in completing multitask conversations. Oracle® Digital Assistant intelligently routes user requests to the skill bot that matches the user query. Oracle® Digital Assistants create a natural, context aware conversational interface, through text or speech that can detect what the user is trying to achieve (intent) and respond appropriately with information or results of transactions from Application Programming Interface ("API") connections to any back-end enterprise applications and information sources.

In some embodiments, digital assistant 108 (or another software component, such as a component not depicted in FIG. 1) can detect a signal in a user interaction via a given channel of channels 102. For example, a skill of digital assistant 108 can be configured to detect a signal in the user interaction based on a chat with the user on a first client device (e.g., smart earbuds) via one of channels 102.

Based on the detected signal, server 104 (or another software component, such as a component not depicted in FIG. 1) can initiate an interaction with the user on a second client device, such as a tablet, smartphone, or a smart speaker. The interaction with the second client device can be over a different channel from channels 102 and/or can leverage another skill of digital assistant 108. In some embodiments, the interaction with the user on the second client device over the different channel may result in improved user experience, such as provide an improved interface for accomplishing a task associated with the signal detected in the initial user interaction.

The following description includes recitations of a criterion or criteria. These terms are used interchangeably throughout the disclosure, the scope of criteria is intended to include the scope of criterion, and the scope of criterion is intended to include criteria.

Figure 2:
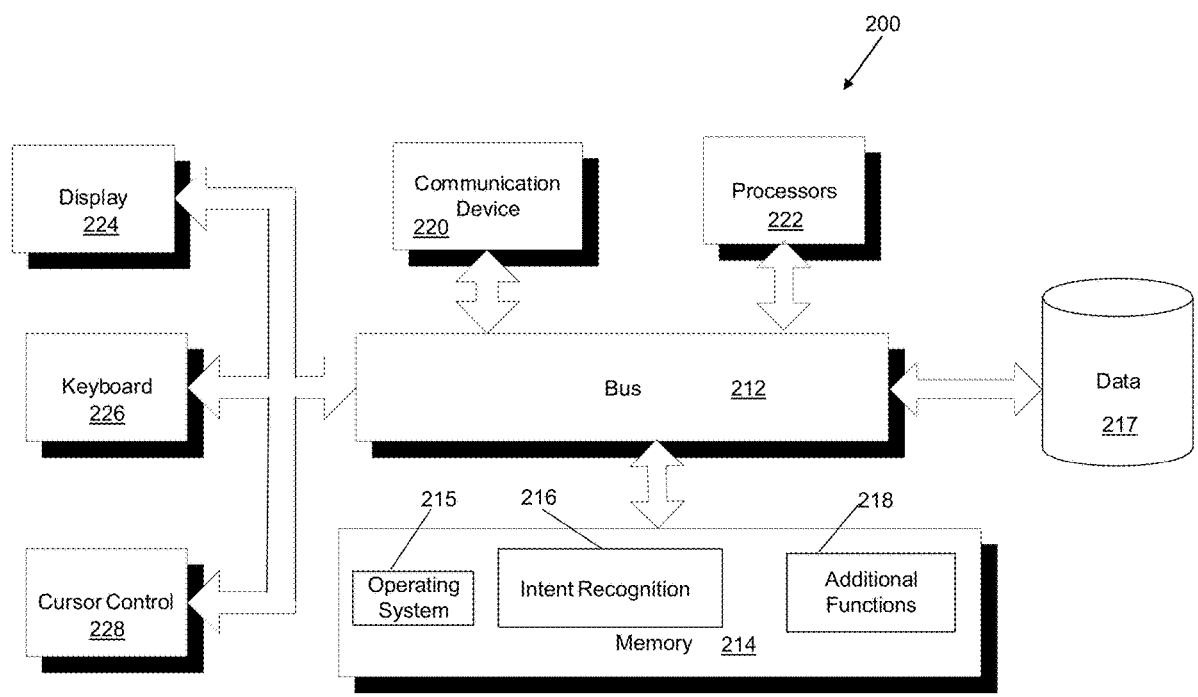
FIG. 2 illustrates a block diagram of a computing device operatively coupled to a system, according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, intent recognition module 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, an intent recognition module 216 that implements the user interaction functionality disclosed herein, as well as other applications modules 218. Operating system 215 provides operating system functionality for system 200. In some instances, intent recognition module 216 may be implemented as an in-memory configuration. In some implementations, when system 200 executes the functionality of intent recognition module 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218, intent recognition module 216, or any other element of system 200 may include various modules of Oracle® Cloud Platform, Oracle® Cloud Infrastructure, Oracle® Digital Assistant, Oracle® Cloud Applications, for example. A database 217 is coupled to bus 212 to provide centralized storage for modules 216 and 218 and to store, for example, data received by intent recognition module 216 or other data sources. Database 217 can store data in an integrated collection of logically related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HDFS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, and the like). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

Figure 3:
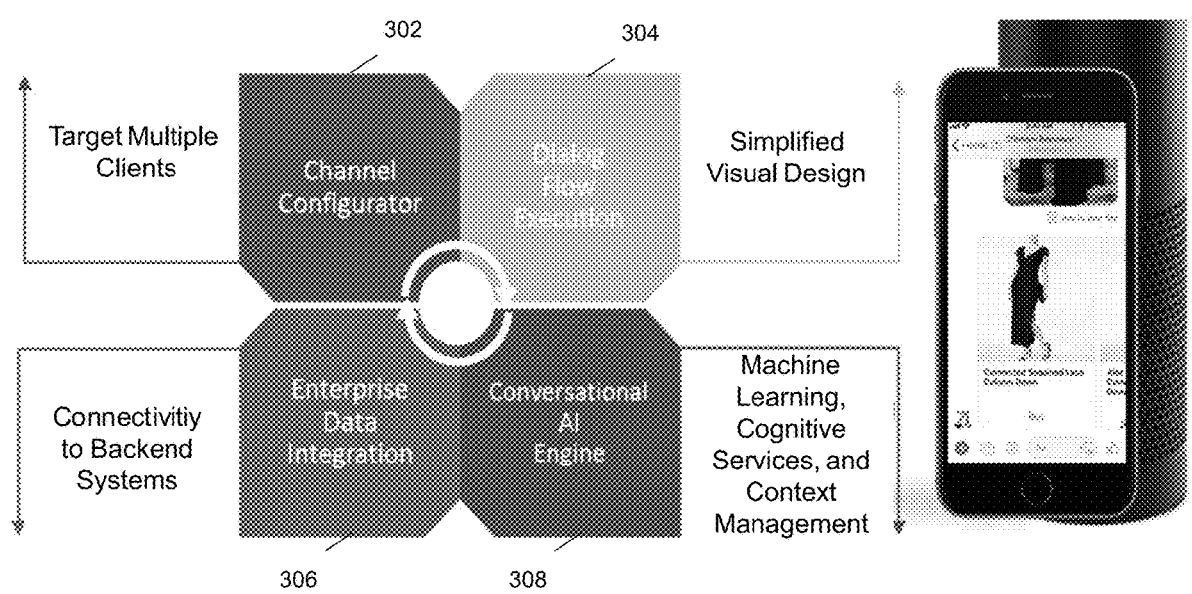
FIG. 3 illustrates a diagram for using multiple channels to interact with a user, according to an example embodiment.

FIG. 3 illustrates a diagram for using multiple channels to interact with a user, according to an example embodiment. FIG. 3 includes channel configurator 302, dialog flow execution 304, enterprise data integration 306, and conversational engine 308. The diagram of FIG. 3 illustrates the functionality of a digital assistant in some embodiments. For example, a digital assistant can include channel configurator 302 for communicating with users over a number of channels (e.g., messaging, voice, chat, and the like) and via a number of applications (e.g., Skype, third party digital assistants, such as Alexa, Siri, or Cortana, short message service ("SMS"), WhatsApp, FB Messenger, Slack, iMessage, Microsoft Teams, any other suitable messaging platform that supports Hyper co Transfer Protocol ("HTTP") Webhooks, and the like).

In some embodiments, channel configurator 302 can abstract communication and user interface ("UI")/user experience ("UX") aspects of the channel. For example, messenger specific interfaces can be abstracted by channel configurator 302 such that a number of messaging applications can be compatible. In some embodiments, channel configurator 302 abstracts speech components, such as speech components related to voice assistants (e.g., Siri or Alexa) and/or can use a speech to text component to pass data to natural language processing elements.

A digital assistant can also include dialogue flow execution 304 for modeling a conversation. For example, dialogue flow execution 304 can include a state machine that executes a context driven workflow with scoped variables. In some embodiments, dialogue flow execution 304 can include components of artificial intelligence ("AI"), natural language processing ("NLP"), and machine learning such that a conversation/dialogue flow can be modeled.

A digital assistant can also include enterprise data integration 306 for connectivity with backend systems such as enterprise resource planning systems, human capital management systems, customer service systems, sales systems, e-commerce platforms, third-party systems, and the like. For example, enterprise data integration 306 can implement message channel visualization and includes components that provide integration to mobile cloud services (e.g., use APIs that have been created for the mobile channel).

A digital assistant can also include conversational engine 308 for conversational artificial intelligence, such as machine learning, cognitive services, context management, chat bot functionality and other suitable functionality. For example, conversational engine 308 can include active machine learning that identifies the intent of the conversations (e.g., from the end user) and extracts entities from unstructured data (e.g., to create a structured 'query' to retrieve data from an enterprise and respond). In some embodiments, the conversational engine 308 includes an ensemble of algorithms.

As the proliferation of user devices continues, consumers will increasingly have a mix of websites, applications, devices (e.g., smartphones, tablets, smart speakers, smart earbuds, and the like) and channels of interaction (e.g., web, mobile application, conversational chatbot, voice and the like) on their journeys, such as on purchasing journeys. Embodiments enable these interactions to be held simultaneously across channels. For example, to orchestrate/optimize the journey (e.g., in real-time) enterprises/merchants can leverage techniques to identify a signal (e.g., across channels simultaneously), such as a signal that indicates a consumer intent, and then can react to that signal accordingly (with decisioning technologies) to perform actions or surface/relay content via visual and/or audio client device.

In some embodiments, a user signal (e.g., consumer intent which indicates value in a second channel of interaction, such as consumer need for shopping assistance) can be identified, for example by utilizing pattern recognition in a user data stream. Identified signals can be then used to trigger a second channel of interaction, such as between a digital assistant and the user. For example, a user interacting with an enterprise webpage on a first client device using a first channel (e.g., smart phone using a display and user interface) can be prompted to communicate with a second client device using a second channel (e.g., smart speaker using a voice channel) based on a detected signal that the user has questions or is experiencing problems while interacting over the first channel. Also, a user interacting with an enterprise webpage on a first client device using a first channel (e.g., smart earbud) can be prompted to communicate with a second client device using a second channel (e.g., a smartphone having a display) based on a detected signal that the user has questions or is experiencing problems while interacting over the first channel.

In some embodiments, customer journey mapping and/or modeling across different channels (e.g., web, voice, and the like) can be implemented using, for example, Oracle® Streaming Analytics ("OSA"), decision models with Oracle® Adaptive Intelligence for CX, and/or event-driven rules engines such as the Oracle® Engagement Engine for customized guardrails. In some embodiments, Oracle® Adaptive Intelligence for CX implements layered decision science that selects algorithms/model (e.g., machine learning algorithms and/or models), features of the data, and/or hyperparameters suitable to various circumstances.

In some embodiments, Oracle® Engagement Engine can include one or more rules, or a combination of zero or more conditions and an action (e.g., IF CONDITION IS TRUE THEN PERFORM ACTION). Examples of conditions include:
   Does the visitor have cookies enabled on their browser?
   Is the visitor's IP address within a specified range of IP addresses?
   Is today's date after a specified date?
   Has the visitor previously been on a call with a contact center agent?
In some embodiments, an action is an instruction to be followed based on the condition(s). Example actions include:
   Display a Call Invitation.
   Run a custom JavaScript function.
   Populate a custom data field with information from a specified HTML page element.
In some embodiments, a rule can be defined to determine when to display a call or chat invitation to a visitor. For example, a rule can be defined to display a call invitation when a visitor has been on a particular webpage for 60 seconds (e.g., dwell time meets or exceeds 60 seconds). In this case, the condition is that the visitor has been on a webpage for 60 seconds, and the action is to display a call invitation. This can be expressed as: IF TIMEONPAGE>=60 SECONDS THEN DISPLAY CALL INVITATION. In some embodiments, the inclusion of multiple conditions, actions, and false actions can result in a high level of scope for complexity when designing rules Embodiments of Oracle® Commerce Cloud functionality can also be extended through widgets, REST APIs, webhooks, and/or server-side extensions. For example, user interface customization, extensions, widgets and REST APIs can, at times, be employed together. In some embodiments, webhooks can be used as an outbound communication to integrate with external systems and REST APIs can be used for inbound communications from external systems. Embodiments also include server-side extensions, which allow customers and partners to develop custom code that runs on the server side. These extensions can be accessed either as a REST endpoint or configured as the receiving end of Webhooks.

In some embodiments, one or more of AI, machine learning, pattern recognition, and/or defined rules can be used to detect a signal in a user stream of data and trigger an interaction with a client device. For instance, a website for a fashion retailer can utilize pattern recognition or rules-based technologies that determine/predict when a visitor has an intent to leave the website or is displaying intent to purchase but is in need of assistance. Embodiments can trigger an invitation to text or speak with a digital assistant (e.g., on a device other than the device used to navigate the website). In some embodiments, subsequent interactions with the digital assistant (e.g., online or voice) can be reflected on both the online/web channel and in the digital assistant channel (e.g. the online channel can be made aware of a simultaneous verbal help request to a proximate smart speaker). The online or web channel an also be configured to display other useful information, such as a Frequently Asked Questions ("FAQ") webpage, a link to a product detail webpage ("PDP"), and/or a review webpage, to assist in the user interaction. Embodiments can also mirror/connect updates of interfaces (e.g., graphical user interfaces ("GUIs") across online devices (e.g., smartphone, tablet, laptop, desktop, a smart speaker with a screen, a wearable device with a screen, and the like) synchronously—for visual communication to the consumer—and quicker and easier ingest of information (e.g., visual and verbal).

In some embodiments, common entities, like a shopping cart and user profile, can be maintained and synchronized across channels, such as online and voice channels, with Oracle® Coherence (a distributed cache and in-memory data grid solution that is used by applications for fast and reliable access to frequently used data). The Oracle® Integration Cloud Service (hereinafter "ICS") can also be used for applications to communicate with declared mappings and workflows. In some embodiments, reconciling a consumer's interactions across client devices communicating over multiple channels (e.g., online/web device and a conversational device) can be achieved by identification services like the Oracle Cloud Commerce Service (hereinafter "OCCS") and Unified VisitorID Service (hereinafter "UVS"), which allow multiple web applications, sites or components to share a unique visitor identity value.

Conventional implementations fail to achieve real-time pattern recognition and decisioning technologies across channels and devices (e.g., online and conversational channels). Conventional implementations also fail to present and detect common cross-channel information and actions to shared devices. Embodiments utilize stream processing, event pattern recognition, and decision engine technologies to implement real-time and cross-channel cloud-based commerce services. Data and mobile application technologies (e.g., running on cloud container services) for enterprise back-end integration can also be implemented. Embodiments also enable cross-channel interactions with privacy preserving techniques, as users do not necessarily need to install a mobile application from the merchant. User privacy can also be maintained when triggered interactions are based on consent from the user (e.g., consent achieved based on a web message/notification). In some embodiments, user data can be stored in an encrypted format, and can be stored for selective purposes (e.g., minimum data necessary to achieve a specific objective).

Figure 4:
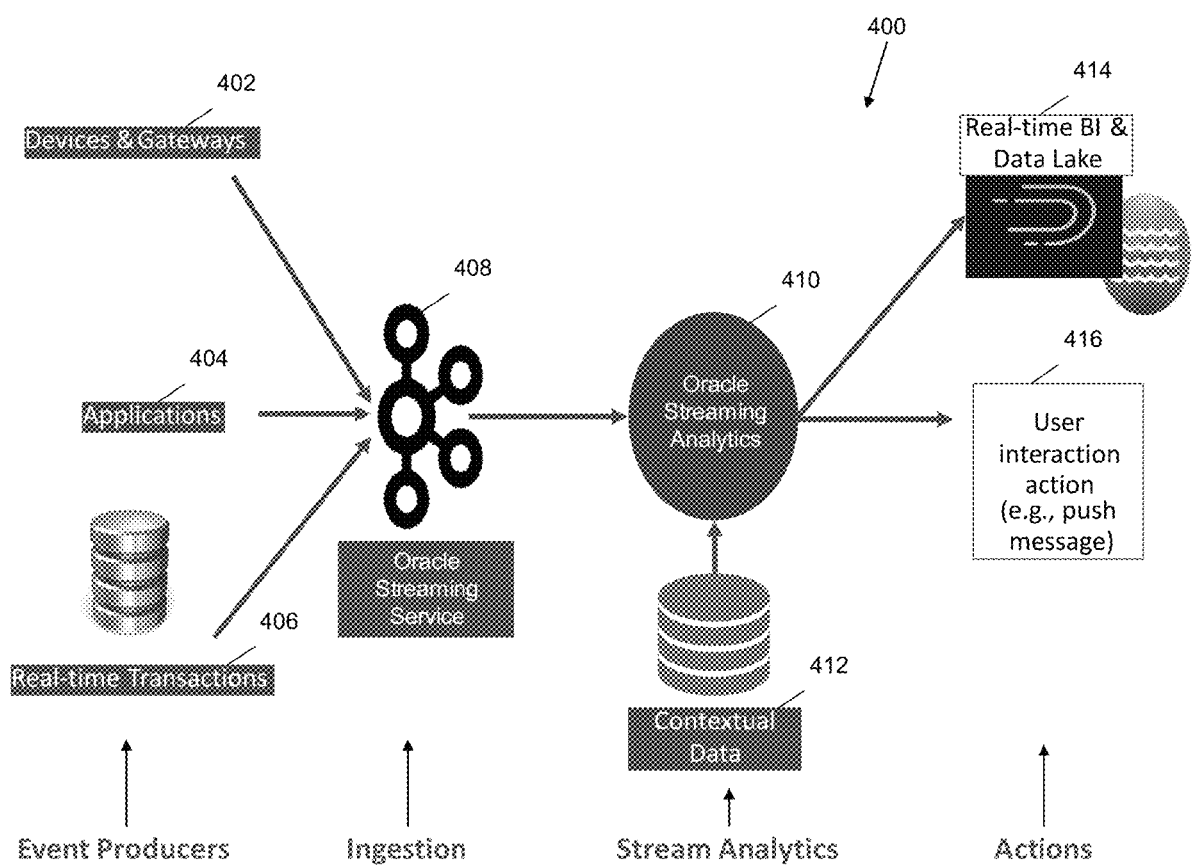
FIG. 4 illustrates a system for processing an event stream using pattern recognition, according to an example embodiment.

FIG. 4 illustrates a system for processing an event stream using pattern recognition, according to an example embodiment. In some embodiments, system 400 can represent a Kafka ecosystem that includes event producer elements, ingestion elements, stream processing elements, and elements that can take action based on the functionality of the previous Kafka elements (e.g., triggering a user interaction on a separate client device). For example, server 104 of FIG. 1 can include elements of system 400. Embodiments of the Kafka ecosystem can include a low latency, high throughput, scalable, and decoupled message broker.

Devices and gateways 402 can include electronic devices, network components, such as gateways, and any other suitable device. For example, devices 402 can include client devices such as smart earbuds, smartphones, smart speakers, tablets, laptops, other devices capable of interactions with users, and any other suitable device or gateway. Applications 404 can include software applications capable of interacting with users, receiving/producing events for publication to a stream of events, and can further include micro-services. For example, applications 404 can include web browsers, software on client devices such as a smart speaker or smartphone capable of interacting with a user and/or cloud service, software on a tablet such as a native application, software on a laptop or desktop, conversational software, chat software, and the like.

Real-time transactions 406 can include software elements, such as a database, and that can publish real-time transactions as a stream. Each of these elements can serve as an input for Kafka producers. For example, one or more of database transaction logs, sensor data, social media data, a click stream or web activity (e.g., for a user of an electronic device), audio data (e.g., utterances from a user), chat data (e.g., between a user and a bot), and/or geo-location data can be used to produce a stream of events.

Streaming service 408 can be used to ingest data from the producers to build the stream of events. In some embodiments, streaming service 408 receives the input from one or more of devices and gateways 402, applications 404, and real-time transactions 406 and builds the Kafka topics and partitions that are used to structure event streams in a Kafka ecosystem. For example, one or more of devices and gateways 402, applications 404, and real-time transactions 406 can be Oracle® Cloud Commerce client producing elements and streaming service 408 can be Oracle® Streaming Service ("OSS").

In some embodiments, clients producing events of interest (such as page views, searches, and the like), can generate data conforming to a standard or protocol (e.g., an (Apache) Avro schema). For example, Avro schemas can be defined using JavaScript Object Notation ("JSON"), and Jackson (a Java library for handling tasks like reading and writing (parsing/generating) and data binding to/from Java objects) can convert the JSON objects into generated Avro schema classes. These generated Avro schemas can then be serialized into a byte array and sent as the payload of a Kafka message. Any other suitable data formats and functional elements (e.g., Jackson substitutes) can be implemented.

In some embodiments, the data can be placed onto a Kafka topic (e.g., shared between Kafka elements, such as OCCS and OSS). For example, data can flow from OCCS into OSS via Kafka topics, which are defined and configured in OSS. OCC REST endpoints can call into code which serializes data into messages to be placed onto that topic. In some embodiments, the data can be deserialized (the reverse process) at the point of consumption.

In some embodiments, a visitor ID can be associated with a particular user/visitor/electronic device (e.g., via an identification service). For example, a user can be assigned a visitor ID value by OCCS Visitor ID Service. In some embodiments, a visit or session can be defined as a series of page requests or, in the case of tags, image requests (e.g., from the same uniquely identified client). A visit can be considered ended when no requests have been recorded in some number of elapsed time (e.g., a 30-minute time out, and the like). In this manner, a visitor may have multiple visitIDs during a session. In different circumstances, a visit can include one-page view or thousands. A visitor can be considered to be the uniquely identified client that is generating page views or hits within a defined time period (e.g., day, week or month). In some embodiments, a uniquely identified client can be a combination of a machine (e.g., desktop computer at work, smartphone, laptop, tablet, and the like) and a web browser. In an example, the identification (which can include the Visitor ID) can be a persistent cookie that has been placed on the device by the site page code, an additional piece of cached JavaScript, or any other suitable form of identification.

In some embodiments, a visitor profile can allow multiple web applications, sites, or components to manage visitor(s) across applications, sites, or components, including sharing of key data. For example, this can be sharing of visitor information, as specified by a customer across shared services (e.g., Oracle® Engagement Engine, Commerce, Recommendations, Oracle Service Cloud, and the like.

In some embodiments, the visitor ID can be passed to streaming service 408 or other Kafka ecosystem components (e.g., via Kafka messaging). For example, the visitor ID can be used to access a data store (e.g., data lake) to retrieve data (e.g., contextual data 412) about the user/visitor/electronic device. In some embodiments, a visitor ID can be associated with multiple user devices (e.g., tablet, smart speaker, smartphone, laptop, and the like).

In some embodiments, one or more event producers can include Oracle® GoldenGate Big Data Handler for Kafka, where updates to database records (such as orders and user profiles) can be replicated to a Kafka component, such as streaming service 408, in real-time. In the context of Kafka, Oracle® GoldenGate provides a mechanism for streaming changes made to a table (or set of tables) and making them available to other components/processes in a pipeline. In some embodiments, streaming service 408 can be an Oracle® Streaming Service, Oracle® Engagement Engine, and/or Oracle® Stream Analytics service or any other suitable component of a Kafka ecosystem.

Stream analytics 410 can be used to analyze the built stream of events to perform additional processing. For example, stream analytics 410 can filter, aggregate, transform, correlate, and/or geofence the data from producers to build (consume and pipeline) the stream of events. Stream analytics 410 can be a Kafka stream processing element. In some embodiments, stream analytics 410 can be implemented using Oracle® Streaming Service, Oracle® Engagement Engine, and/or Oracle® Stream Analytics. Embodiments include performing pattern recognition within built streams of events using stream analytics 410. For example, a number of predetermined patterns can be defined, and stream analytics 410 can analyze built streams of events to recognize the predetermined patterns within the streams.

Example predetermined patterns that can be used to determine intent can include predefined associations or event relationships. For example, predetermined patterns can include event associations such as: 'A' followed by 'B', 'A' not followed by 'B', Detect Missing Event, Detect Duplicates, and other suitable patterns. A predetermined pattern with an 'A' followed by 'B' association can include event definitions for the 'A' and 'B' events, such as an 'A' event that adds a product to a cart and a 'B' event that removes the product from the cart. Other 'A' followed by 'B' examples can include: searching for a product or category and then viewing a product specific webpage; searching for a product and then searching for a specific variant of that product; canceling an order after being notified of a shipment delay; adding a product to a cart and triggering stock check that determines the item is in-stock at a nearby store; and the like.

A predetermined pattern with an 'A' not followed by 'B' association can also include event definitions for the 'A' and 'B' events, such as an 'A' event that adds a product to a cart and a 'B' event that does not include checkout of the cart (e.g., finalizing the order). Other 'A' not followed by 'B' examples can include: searching for a particular product or category and then not viewing any specific product detail page; navigating to a lowest level product category but not viewing any specific product detail page; searching for a product previously purchased by the user but not adding the product to a cart; having items in a cart but failing to checkout; checking out an order but failing to qualify for free shipping based on the total amount for the order; checking out an order but failing to qualify for a promotion; and the like.

A predetermined missing event pattern can define a series of a events, where it can be recognized when one of the defined events is missing, such as searching for a product or category, adding a product to a cart, but failing to checkout (e.g., finalize the order). Other missing event patterns can include: adding products to a cart, checking out, but encountering a payment authorization failure (or some other failure) that causes the order to not be submitted/processed; repeated viewing of a product specific page without the product being added to a cart; and the like.

A change detector pattern, up-trend pattern, and/or down-trend pattern can define event associations related to the changes in the value of a data point, where a change can be detected, an up-trend can be detected, or a down-trend can be detected. Example events can include an increase or decrease in the number of searches performed, an increase or decrease in the number of visits for a user (e.g., visits to a given website over a period of time), an increase or decrease in an amount spent at a website by a user (e.g., dollar amount spent over a period of time), and the like. Other example data points for which changes or trends can be detected are transactions types (e.g., changes to a number of online pick up orders in-store transactions or direct ship to customer transactions), a number of returns, and the like.

A predetermined timing pattern can define an amount of time, where it can be recognized when the amount of time has elapsed (e.g., based on Oracle® Engagement Engine rules). For example, a time on page pattern/rule (e.g., dwell time) can compare the time that a visitor has been on the current page of the website against a specified value. The time on page pattern/rule can include the following conditions: operator (used to specify the type of comparison to perform); and time (used to set the upper limit of the time the visitor spends on a page before a criterion is met and/or before returning a true value). In another example, a time on site pattern/rule (e.g., dwell time) can compare the time that a visitor has been on the website against a specified value. The time on site pattern/rule can include the following conditions: operator (used to specify the type of comparison to perform); and time (used to set the upper limit of the time the visitor spends on a website before a criterion is met and/or before returning a true value). Time can be defined in hours, minutes, and seconds (e.g., using numeric steppers).

In some embodiments, these patterns can be combined (e.g., in a pipeline) such that a defined pattern can include any combination of the above described patterns, including, but not limited to: an 'A' followed by 'B' pattern with a location based pattern, multiple 'A' followed by 'B' patterns (or multiple iterations of any of the patterns), a missing event pattern with a location based pattern, event patterns and timing patterns, and the like.

In some embodiments, a number of events can occur between, for example, an 'A' followed by 'B' pattern of events, and the predetermined pattern can still be recognized within the event stream. For example, for a pattern that includes an 'A' and 'B' event of adding and removing a product from a cart, the intervening events can include viewing different product pages, adding and/or removing other products from the cart, performing searches, and the like. In this example, the 'A' followed by 'B' pattern is recognized within the event stream among the intervening events. Other patterns can similarly be recognized in the presence of intervening events. In some embodiments, a recognized pattern can be used to provide relevant information to internal systems/entities. For example, real-time information can be provided to various teams (e.g., customer experience, customer engagement, marketing, and others) on products viewed or searched in the last visit (or X visits), but not purchased by a user/visitor.

In some embodiments, contextual data about the electronic device or a user of the electronic device can be used to determine an intent or recognize a signal in the streaming data. For example, this contextual data can include past online shopping behavior (e.g., past product purchases, a frequency for purchasing, a frequency for taking advantage of promotions, and the like), past products viewed (e.g., over a 30 day window), past searches, geolocation history, device type(s) (e.g., mobile device, laptop, desktop, smart speaker, smart earbud), day of week/month and/or time of day behavior (e.g., day of week/month and/or time of day when a user typically views or browses versus when a user typically submits online purchases), weather history (e.g., current or forecasted/predicted weather), user demographic information, and the like.

In some embodiments, a contextual criterion can be used in addition to a recognized predetermined pattern. For example, when a pattern is recognized in a stream of events, contextual data for the corresponding user can be compared to a contextual criterion. The contextual criterion can be based on the recognized pattern. For example, when a pattern indicates repeated views of a product, the contextual criterion may relate to the frequency that the corresponding user buys the product or a similar product. When the frequency meets the contextual criterion (e.g., when the user regularly buys the product or a similar product), a corresponding action can be taken (e.g., another interaction with the user or a separate device and channel can be triggered). In an example where the pattern represents a cart that has had a product removed, the contextual criterion can include the user's past transaction history with the product. For example, if the user has not previously purchased the product, a corresponding action can be taken (e.g., triggering a user interaction through a new client device, such as using a push message/notification).

Based on the processing and analytics performed by stream analytics 410, one or more actions can be performed. For example, module 414 can perform real-time business intelligence (BI) functionality or can store relevant/insightful data in a data lake. Further, module 416 can perform an interaction with an electronic device/user, such as transmit a web push message to the electronic device based on a recognized pattern within a stream of events associated with the electronic device and/or contextual data associated with a user of the electronic device meeting a contextual criterion. In some embodiments, the web push message can prompt the user to interact with a new client device (e.g., smart speaker, smartphone or the like), where user consent is received (based on the web push notification) to interact with the new client device.

Embodiments can achieve the disclosed functionality using a number of technologies, frameworks, standards, and implementations. For example, Apache Kafka Streams API can be leveraged for stream processing. Apache Flink can also be used for streaming and batch processing in a high throughput, low latency mode. KSQL from Confluent, a streaming SQL engine that enables real-time data processing against Apache Kafka, can be used to analyze/process a Kafka stream. Apache Spark Streaming (from Databricks) is a scalable fault-tolerant streaming processing system that natively supports both batch and streaming workloads.

Oracle® BigData SQL ("BDSQL") can query across Kafka topics (including data in motion) and data at rest (e.g., in Oracle® relational databases, NoSQL data stores, Hadoop data lakes, and the like). In addition, the SQL Pattern matching functionality in the Oracle® 12c database can also be used to augment or in place of Oracle® Streaming Analytics pattern matching. Embodiments can also recognize patterns in sequences of events using SQL, for example by treating a sequence as a stream of rows, and using a row in a stream to represent an event. Embodiments of Oracle 12c database incorporate a MATCH_RECOGNIZE clause into the analytic function syntax to enhance pattern matching from SQL. Oracle® Sparkline can also be used with/in place of data lake business intelligence (e.g., at scale).

In some embodiments, recognized pattern(s) and/or contextual data can be used to trigger user interaction on a new client device over a new channel. For example, a signal that indicates a user experiencing a technical issue can be detected in a user stream (e.g., stream of web data). In some embodiments, the user stream can be generated by a user navigating a website of a commerce entity on a smartphone. Based on the detected signal, the user can be prompted to interact with a proximate smart speaker or the smartphone. For example, a web push message/notification can be transmitted to the user's smart earbuds or smartphone, and after receiving consent from the user based on the web push message/notification, the user interaction on the smart speaker or the smartphone can be triggered.

Web push messages/notifications can be selectable (clickable) messages, sent to the user's/visitor's/subscriber's browsers (e.g., running on a client device, such as a smartphone) and can appear next to the task bar (or in the display of a mobile device). These messages/notifications can be "browser based", which means they can be accessible across different platforms and devices. In addition, whether users are connected through mobile devices, tablets, or desktops, web push messages/notifications can reach their devices in real-time. In addition, a web push notification can be displayed when the web browser is browsing any website. In some embodiments, the web push notifications can include selectable actions, such as hyperlinks, and rich media. Web push messages/notifications can be particularly effective, for example because they can be brief and can be delivered in real-time to increase user engagement and customer retention. In some embodiments, web push messages/notifications can be used to trigger a user interaction on a separate client device based on receiving consent from the user.

Embodiments can be implemented for a merchant's e-commerce web presence, such as a website. Consider a visitor to a merchant's website (e.g., using the OCCS, with the OCCS client configured as a progressive web application (PWA)). The visitor's consent and opt-in to receive push notifications or requested information regarding a product of interest to the visitor from the site can be retrieved based on a message to the visitor's electronic device such as a smartphone. For example, the opt-in can be secured initially based on messaging, and subsequently web push messages can be sent to the user/electronic device based on this initial opt-in. In some embodiments, the opt-in must be secured before the visitor's electronic device can receive push messages. Thereafter, based on predetermined detection patterns of the visitor's behavioral events (e.g., detected signal of intent in the user's data stream) and, optionally, based on the visitor's context (e.g., past behavior, geolocation, device, audience, time of day, weather, demographics etc.), one or more push messages or information regarding a product of interest to the visitor can be transmitted to the visitor's electronic device, which can be configured to display such a notification (e.g., in a mobile web browser in real-time). Such functionality can avert missed opportunities for the interaction with the user, reduce friction with the shopping experience, and provide other tangible benefits that flow from better understanding a visitor's intent by way of behavioral analytics.

For example, a lost opportunity can be a contextual stream pattern with a visitor searching on site for a product or category, adding a product to a cart, and then removing the product from the cart. This can be similar to a flow in a brick and mortar store where a customer physically picks up a product, examines it, but places it back down (and in some instances, this interaction can be captured by sensing equipment, such as cameras). In this example, an intervention action (with a push notification) can be performed without the need for a native mobile application, for instance when a PWA is implemented by the merchant/cloud service provider. Embodiments include PWAs that provide utilities which are similar to conventional applications that are natively installed, including offline web pages, web push notifications, and improved load times. However, PWAs do not need to be downloaded/installed on the device itself, thus providing an enhanced online experience that is more likely to be adopted by the user/visitor. In some embodiments, a native mobile application can generate the user web stream.

Figure 5:
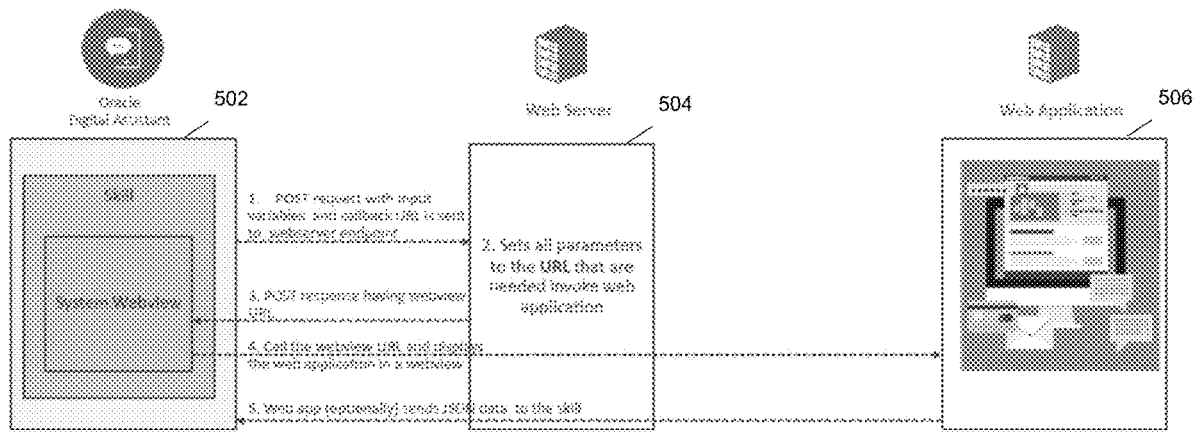
FIG. 5 illustrates communication between a digital assistant and connected devices, according to an example embodiment.

Embodiments leverage user interaction through chat or voice, such as with a smart speaker, smart earbuds or other devices configured with a speaker and microphone (e.g., laptop), where a digital assistant can be used to provide the chat or voice services. FIG. 5 illustrates communication between a digital assistant and connected devices according to an example embodiment. For example, digital assistant 502 can interact with server 504 and web application 506. In some embodiments, the functionality illustrated in FIG. 5 can be triggered based on a detected signal in a client data stream (e.g., detected/recognized based on the functionality illustrated in FIG. 3). Digital assistant 502 can send a request, such as a POST request, with variables and callback to web server 504. For example, the request can include input variables and a callback URL. Web server 504 can set the parameters for invoking a web application (e.g., web application 506). The request response from web server 504 to digital assistant 502 can include the set parameters (e.g., a webview URL with the set parameters). Digital assistant 502 can then call web application 506 (e.g., using the webview URL) and display the web application in a webview. Web application 506 can then interact with digital assistant 502, such as by sending data (e.g., JSON data) to the digital assistant.

Figure 6:
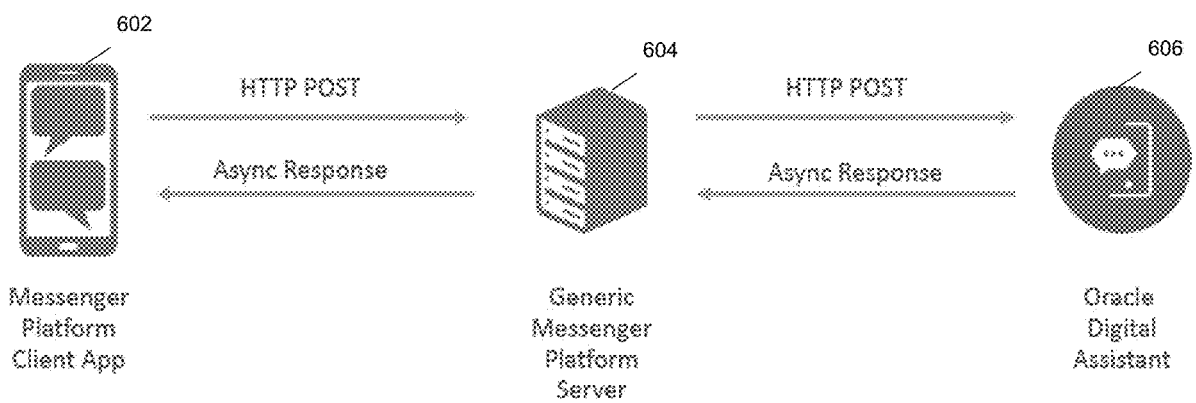
FIG. 6 illustrates device communication for a client application and a digital assistant, according to an example embodiment.

FIG. 6 illustrates device communication for a client application and a digital assistant, according to an example embodiment. Embodiments can be implemented with a number of client-side applications, such as messaging applications on a user's client device (e.g., smartphone). For example, user device 602 (e.g., a smartphone) with a messenger application can communicate with messenger platform 604, and the messenger platform can then communicate with digital assistant 606. For example, an HTTP request (e.g. POST request) can be sent from user device 602 to messenger platform 604, and messenger platform 604 can similarly send, based on the received request, an HTTP request to digital assistant 606. A response, an async response, can then be sent from digital assistant 606 to messenger platform 604, and messenger platform 604 to user device 602.

Figure 7:
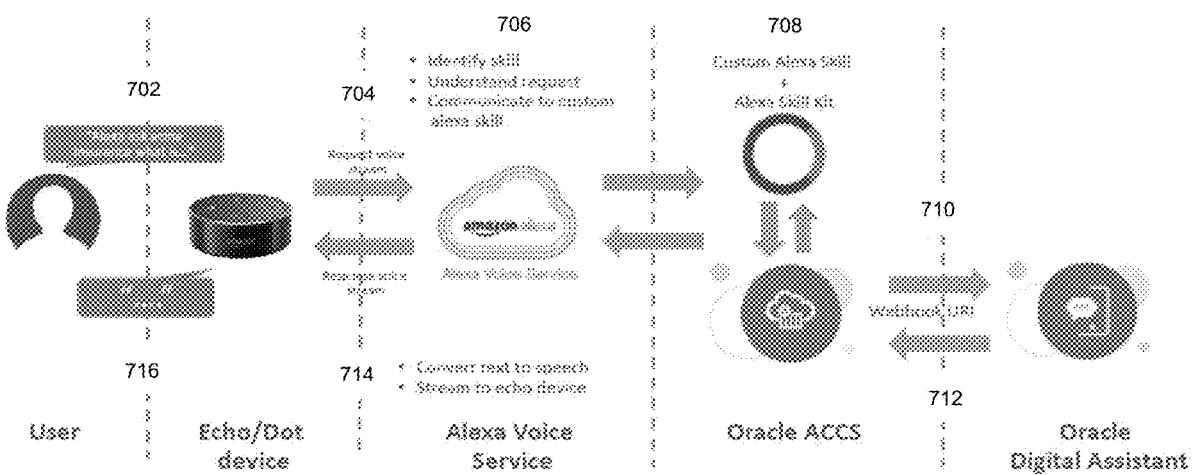
FIG. 7 illustrates user interactions between a client application and a digital assistant, according to an example embodiment.

FIG. 7 illustrates user interactions between a client application and a digital assistant according to an example embodiment. Embodiments can implement across a number of technologies, third-party applications, and other heterogeneous environments. For example, in the diagram illustrated in FIG. 7, at 702 a user can communicate with a smart speaker or a smart earbud, such as ask a question. The smart speaker (or smart earbud) can in turn request voice stream service at 704, such as from a voice cloud service, at 706. At 708, the voice cloud service can request service from a digital assistant cloud service. For example, a configured "skill" (or specialized chatbot) can be configured to service the user's utterance (e.g., question from 702). At 710, a webhook (e.g., webhook uniform resource indicator ("URI")) can be used to communicate with a digital assistant. At 712, the webhook can be used to receive a response from the digital assistant at the digital assistant cloud service. The response can be transmitted from the digital assistant cloud service to the voice cloud service, and ultimately to the smart speaker (or the user's smartphone or smart earbuds) at 714. The smart speaker (or smartphone or smart earbuds) can then be used to respond to the user's utterance (e.g., question) at 716. In some embodiments, the flow from FIG. 7 can be used to interact with a user via a smart speaker (or smart earbud) after receiving consent from the user for interaction on a new client device (e.g., based on a detected signal in a user stream of data and a web push message/notification).

In some embodiments, one or more skills can be configured to implement the communication between a digital assistant (e.g., Oracle® Digital Assistant) and a voice service and/or third-party device (e.g., Alexa voice service/ smart speaker (or smartphone or smart earbuds), and any other suitable service and device). For example, the one or more skills can process requests from the voice service platform/third-party device (e.g., parse requests, such as HTTP JSON requests from the Alexa voice service (AVS) platform), communicate with intelligent chatbots via webhook, and build responses to the requests (e.g., build JSON responses that can be consumed by the voice service/third party device, such as the Alexa voice service and smart speaker (or smartphone or smart earbuds)).

In some embodiments, the digital assistant and voice service/third-party device platform can both use a JSON payload to exchange messages. The format of the messages may be different, and the configured skill can be used to receive and parse a request (e.g., coming from the voice service/third-party device). In some embodiments, the one or more skills can transform the payload from a first format (e.g., format used by the voice service/third-party device) to a second format (e.g., used by the digital assistant). The payload can be sent to an intelligent bot, and it can contain message content and additional information about the user. In some embodiments, the payload can also contain the routing that allows the bot response to be returned (e.g., to the third-party device and the user interacting with the third-party device). The one or more configured skills, which in some embodiments can be a configured application for interacting with the voice service/third-party device platform) can be deployed to a network accessible node (e.g., Oracle® Application Container Cloud Service).

In some embodiments, the voice service/third-party device platform (e.g., Alexa voice service platform) can include APIs for interfacing with the platform. For example, the platform APIs can include speech to text and text to speech transformation functionality. In another example, the APIs can be used to build one or more skills for interacting with the platform. Embodiments utilize the platform APIs to interact with third-party devices (e.g., an Amazon Echo/ Google Home smart-speaker, smartphone or other client device).

In some embodiments, skills for a third-party device platform can be configured to interact with the digital screen of the third-party device (e.g., smart speaker with a screen, smartphone, tablet, smart television, smart home device with a screen, and the like). In some embodiments, a software development kit ("SDK") (e.g., Alexa Presentation Language ("APL") SDK) can be utilized to configure skills to control/adjust the visual display of the third-party device. Configuring a visual skill can include one or more of defining/selecting one or more templates, playing a video (e.g., using a built-in video application), and configuring content for display on the third-party device. Third-party device platform APIs can similarly be used to interact with a display of the third-party device.

In some embodiments, displays on multiple devices can be configured simultaneously (e.g., multiple client devices can be configured to display the same or similar content). For example, a skill for a third-party device (e.g., smart speaker with a display screen or a smartphone) can be configured to control the display of the third-party device. In addition, a second client device with a display (e.g., client device displaying a webpage, such as a smartphone, desktop, or tablet) can be configured, for example using an API that controls the content of the display (e.g., the content of a website displayed by the second client device). For example, the display of a website implemented by Oracle® Commerce Cloud Service can be adjusted using Oracle® Commerce Cloud REST APIs. For example, Store API endpoints can provide access to a storefront, Admin API endpoints can provide access to administrative functionality on the administration server, Agent API endpoints can provide access to agent functionality on the administration server, and Social Wish Lists API endpoints can be used to configure wish list features. In some embodiments, one or more Oracle® Commerce Cloud REST APIs can be used to control/adjust the display of a webpage, and thus the display of the second client device.

In some embodiments, the skills/APIs for the third-party device platform and the APIs for controlling/adjusting the display of a second client device can be used in combination. For example, the screens for the third-party device (e.g., smart speaker with a display screen or a smartphone) and the second client device (e.g., smartphone, tablet, laptop, or desktop displaying a website) can be controlled simultaneously, and the content displayed on these devices can be coordinated. In some embodiments, the screen for the third-party device and the screen for the second client device can be configured to display the same or similar content. In some embodiments, a third-party device can include a device with a screen (e.g., smart speaker with a screen or a smartphone) or a device configured to control a screen (e.g., Google Chromecast, Amazon Firestick, and the like).

In some embodiments, once a signal is recognized in a data stream generated by a user interacting with a client device such as a smart earbud or a web enabled device, a user interaction with a second client device (a smartphone or the like) can be triggered. For example, the second client device can be proximate to the user. In some embodiments, a user can interact with the second client device (e.g., a smartphone) to access a webpage or interface with a web application (e.g., implemented by (OCCS)). The second client device (and optionally browser/application running) can be assigned a visitor_id1 value (e.g., from the Visitor ID service of OCCS). In some embodiments, a signal can be recognized in the stream of data received from the second client device (e.g., indicative of the user's interactions with the webpage or web application). Based on the recognized signal (e.g., intent), a digital assistant (e.g., Oracle® Digital Assistant) can be invoked, such as after receiving consent (e.g., based on a web message/notification sent to the second client device). In some embodiments, the original visitor_id1 parameter and the visitor_id1 can be passed to the digital assistant.

The digital assistant can then invoke a third-party virtual private assistant ("VPA"), such as for speech recognition and natural language understanding ("NLU") functionality. The third-party virtual private assistants can include Amazon/Alexa Voice Services, Google Assistant, and the like. In some embodiments, the digital assistant may also include speech recognition, NLU, and other voice functionality (e.g., Oracle® Digital Assistant using Speak.ai services). In some embodiments, a profile and/or user information based on the visitor ID (e.g., profile and/or account information such as personal/work email address, corporate email account, hotel room number, mobile phone number, location, and the like) can be passed to the third-party platform.

In some embodiments, the third-party platform can then trigger an interaction with one or more devices on the third-party's platform that are proximate to the user (e.g., a proximate smart speaker/device, such as with or without screen displays or a smartphone) based on the user profile/information. For example, one or more third-party devices may be associated with the profile/user information provided to the third-party. In some embodiments, the digital assistant is in communication with the service that implements the webpage/web application (e.g., displayed on the client device), and can utilize the common vistor_id1 value to share relevant user data (e.g., shopping cart information, user profile information, other context, and the like.). For example, Oracle® Mobile Cloud (which can host the digital assistant in some embodiments) can include location-based services, which can provide the ability to deliver contextual information based on the user's location (e.g., using a combination GPS and beacons). The digital assistant can also be in communication with the third-party platform, and thus can continuously pass the relevant user data to the third-party, which can utilize the information to interact with the user using the proximate third-party device.

In some embodiments, the user interaction with the third-party device can be triggered using the third-party platform, relevant APIs, and relevant authorizations and/or authentications. For example, Alexa Voice Service ("AVS") allows developers to utilize voice-enable connected products with a microphone and speaker. Events are considered messages sent from a device to the cloud notifying the third-party platform that something has occurred. The third-party platform API can use logins with the platform (e.g., Login with Amazon (LWA)) for product authorization and can expose an HTTP/2 endpoint.

Figure 8:
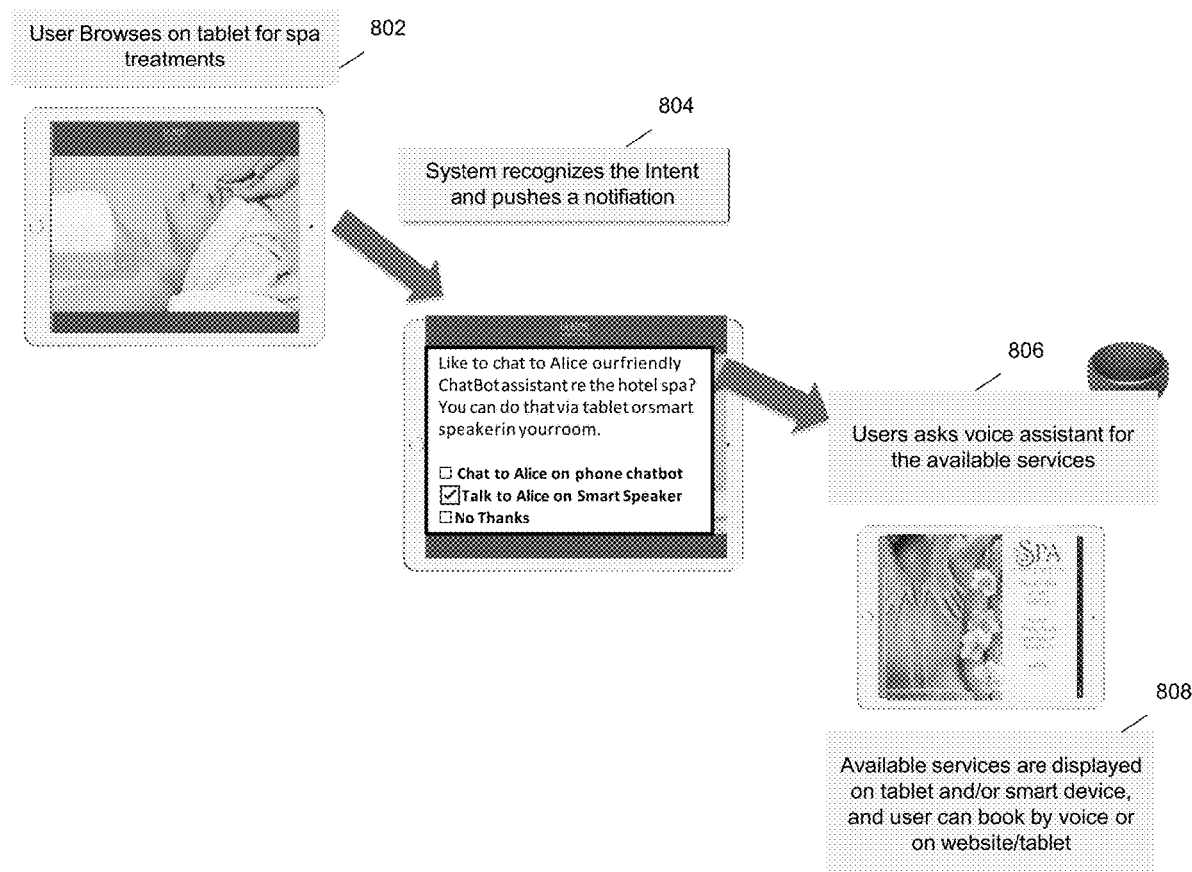
FIGS. 8-11 illustrate example uses cases of interacting with a user across multiple channels based on a detected signal, according to an example embodiment.

FIGS. 8-11 illustrate example use cases of interacting with a user across multiple channels based on a detected signal according to an example embodiment. In FIG. 8, at 802, a user interacts with a browser on a tablet to view options for a spa, such as spa treatments. At 804, a user signal is detected (e.g., intent to purchase a spa treatment) and a push notification is sent to the tablet. At 806, a user interaction with a proximate smart speaker begins based on consent received from the user (e.g., via the push notification), where the user asks for available spa services. At 808, the available services are displayed on the tablet (or smart device), and the user can book a spa treatment either by voice or on the website.

Figure 9:
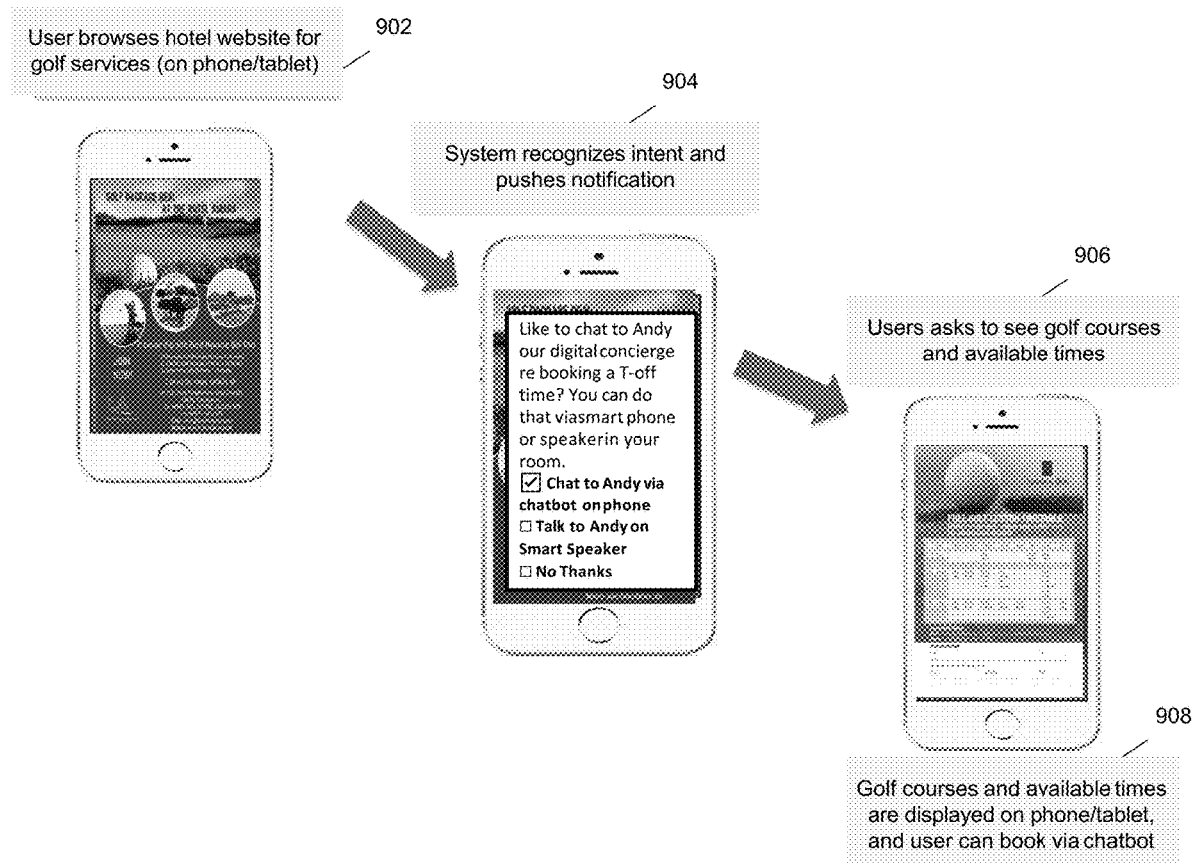

In FIG. 9 at 902, a user interacts with a browser on a smartphone to view options for golfing, such as golf services. At 904, a user signal is detected (e.g., intent to purchase a golf service) and a push notification is sent to the smartphone. At 906, a user interaction with the smartphone or voice begins based on consent received from the user (e.g., via the push notification), where the user asks for available golf services. At 908, the available services are displayed on the smartphone, and the user can book a golf service either by voice or on the website.

Figure 10:
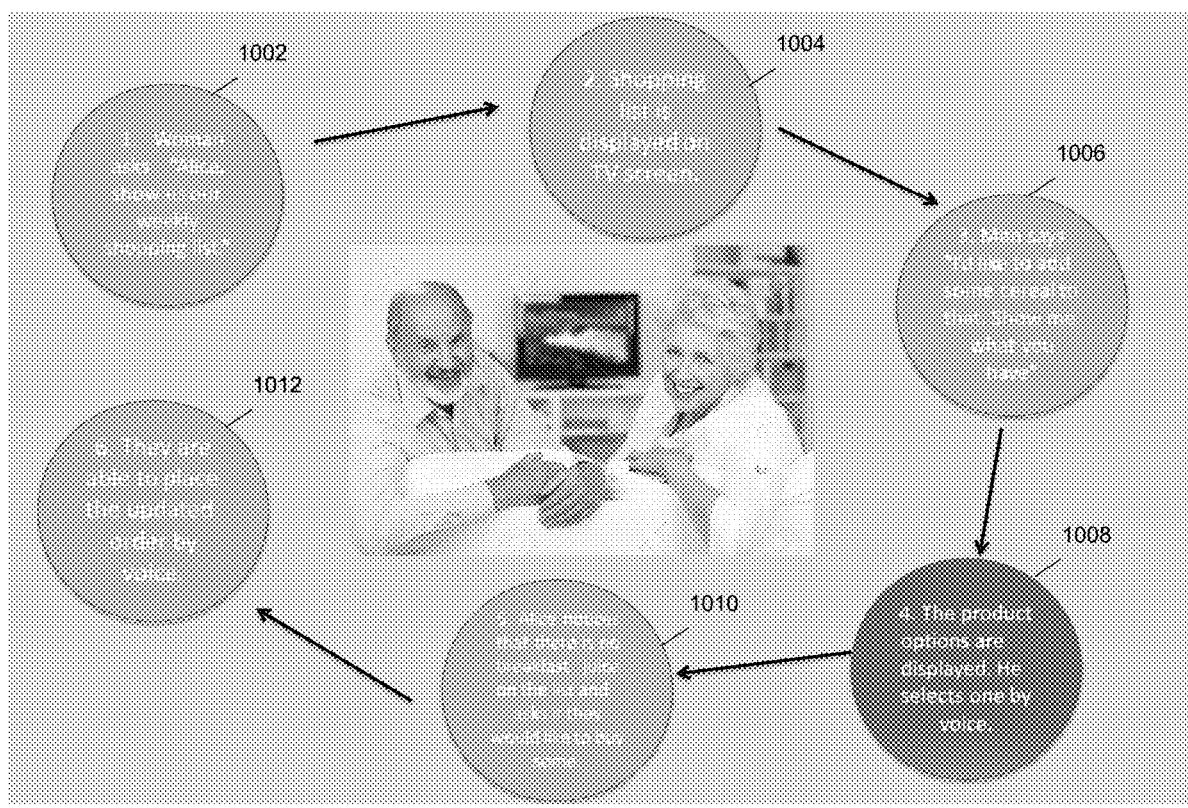

In FIG. 10, at 1002, a user interacts with a smart speaker (e.g., a first client device such as smart earbuds) and asks about a weekly shopping list. At 1004, the shopping list is displayed on the television screen or a smartphone (e.g., a second client device). At 1006, a user speaks to the smart speaker and asks to add an item, cereal, to the shopping list. At 1008, product options are displayed on the television screen and/or provided by the smartphone, and the user selects one by voice by interacting with the smart speaker. At 1010, a smart assistant (e.g., smart assistant cloud service) recognizes that an item is missing from the shopping list (e.g., detects a signal in the data stream), such as breakfast juice, and prompts the user to add the item. At 1012, the user updates the shopping list by selecting a breakfast juice by voice. In some embodiments, the user can receive a text response (e.g., displayed on the television screen or smartphone) to spoken questions (which helps address the challenges of voice assistant interactions in a noisy environment). In some embodiments, the user can interact with a single device, such as a smart television (which can have internet connectivity, voice recognition ("Hi TV"), as well as a built-in/integrated microphone for smart speaker-like voice control/digital assistant functionality). In some embodiments, the user can receive a push/web notification (e.g., on a smartphone) as a reminder to review their weekly shopping list based on a day of the week, or this message can be displayed on the television screen. It is to be understood that the digital shopping list can be accessible when the user is away from home or in the retail store via the OCCS REST APIs and accessible to the digital assistant/Alexa Voice Service via the smart earbuds/smartphone invocation.

Figure 11:
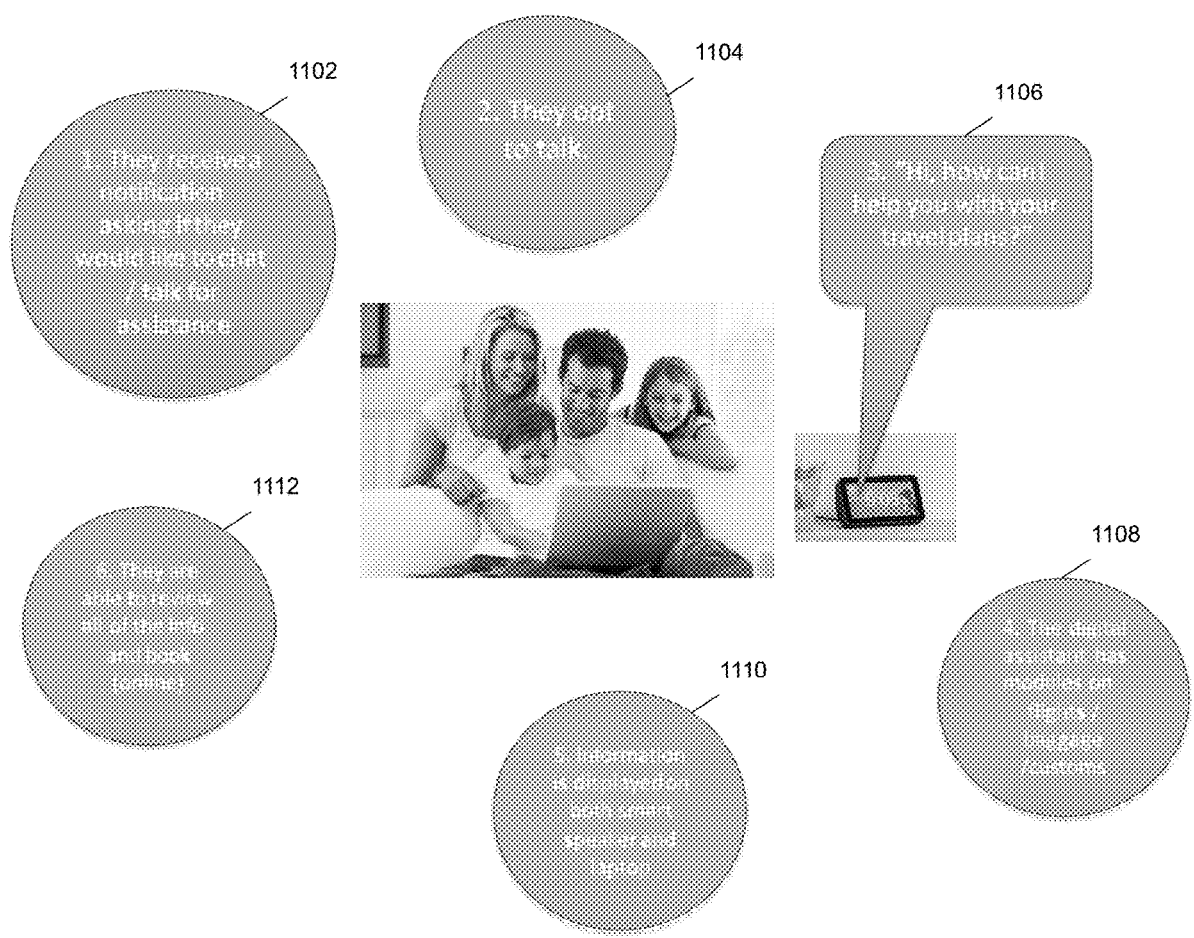

In FIG. 11, a user (or multiple users) is interacting with a travel webpage using a browser on a laptop, tablet, or smartphone. At 1102, the user receives a notification (e.g., based on a recognized signal in the user's web activity) asking if the user would like to chat with a nearby device for assistance. At 1104, the user provides consent to talk. At 1106, a transaction with a smart speaker that includes a display is initiated. At 1108, the smart speaker is in communication with a software digital assistant that includes various modules (or skills) related to travel, such as flights, baggage, customs, and the like, and the user can interact with the smart speaker to get information about these different aspects of travel. At 1110, information is displayed on the display of the smart speaker simultaneously with information displayed on the laptop, tablet, or smartphone. At 1112, the user books travel through an interaction with the smart speaker or an interaction with the laptop, tablet, or smartphone (e.g., based on the information gathered while interacting with both the smart speaker and the laptop, tablet, or smartphone).

In some embodiments, a signal (e.g., voice signal, trend or intent) can be recognized in a user data stream (e.g., generated while a user interacts with a first client device), and based on the recognized signal an interaction with a second client device can be triggered. In some embodiments, the user may be interacting with the first client device and the second client device when the signal is recognized in the user data stream, and the user's interactions with the first client device and second client device (e.g., display of the devices or audio from the devices) can be configured based on the recognition. The user interactions can include visual interactions (e.g., display of information, text or chat, and the like), audio interactions (e.g., voice interactions, both transmitting and receiving, or other audio signals), a combination of these, and any other suitable interaction.

In some embodiments, based on one or more of the interactions, an action can be performed by execution of a software function. For example, based on a newly triggered interaction with a second client device, or interactions with both the first client device and the second client device, an action can be performed by execution of a software function. The software functions/actions can include adding one or more items to a shopping cart, placing an order/purchasing one or more items, tracking the status of a shipment or order (and displaying the results), initiating the return of a purchased item, initiating the exchange of a purchased item, booking an appointment (e.g., with a service professional to repair or troubleshoot an item), executing a database batch process configured based on the user interaction(s), and the like.

In some embodiments, OCCS REST APIs can provide a set of endpoints for implementing one or more of the actions and/or execution of the software function. For example, these APIs can be used extend the capabilities of a digital assistant, website, native application, or any other suitable software interface for interacting with a user over a given channel. In some embodiments, third-party services, such as payment gateways, tax services, inventory management, and/or order management systems ("OMS"), can be accessed via secure webhooks.

Furthermore, the REST APIs provide an extensive set of endpoints for configuring and managing a retail store. Also, the retail store can use these APIs to extend the capabilities of the retail store by integrating with other Oracle Cloud offerings and external systems, including order management systems and payment providers. In particular, the REST APIs consist of several sets of endpoints such as store API endpoints that provide access to the storefront. The Admin API endpoints provide access to administrative functionality on the administration server. Two subsets of the Admin API endpoints, the Search Admin and Configuration and the Search Data and Indexing API endpoints, provide access to search functionality on the search server. The Agent API endpoints provide access to agent functionality on the administration server. Finally, the Social Wish Lists API endpoints are used to configure wish list features.

Regarding webhooks, a webhook sends a JSON notification to URLs that are specified each time an event occurs. External systems can implement the Oracle Commerce Cloud Service API to process the results of a webhook callback request. For example, the retail store can configure the Order Submit webhook to send a notification to the store's order management system every time a shopper successfully submits an order. Also, the retail store can configure a Shopper Registration webhook to send a notification to the store's customer management system every time a new shopper has registered on the store's web site. Finally, the retail store can configure a Shopper Account Update to send a notification to the store's customer management system every time a registered shopper has changed their account details.

In some embodiments, a digital assistant (e.g., Oracle Digital Assistant), such as a digital assistant interacting with a client in a dialogue or verbal mode, can request OCCS (e.g., via REST API interface) to add/remove items to/from a cart (or wish-list), submit/cancel/update an order, return or exchange an order, track the status of an order, request order history, request current orders, update a shopper profile, and any other suitable function/action. In some embodiments, an executed database process can include a request for an order history report, a request for a list/report of unfulfilled orders (or different order processing state-'saved', 'fulfilled', 'cancelled', 'approved', and the like), a request for a list/report of unpaid orders (or different payment status-'pending', 'settled', 'invoiced', and the like), a request for any of the above list/reports to be emailed out or displayed on a client device, a request to expedite/update the shipping method of open orders (e.g., from 3-day to overnight), a request to publish content (e.g., catalog updates) from staging/preview systems to the production storefront (which can be database intensive), where the request could be triggered/based on increasing/decreased sales of relevant products/brands/categories, and/or a request for OMS to update order/inventory status.

In some embodiments, Oracle® Integration Cloud ("ICS") can be used for implementing one or more of the actions and/or execution of the software function. For example, OIC can integrate applications and data by leveraging a library of pre-built adapters to connect with a variety of applications, services, and/or databases, such as OCCS to an ERP (e.g., Oracle® e-Business Suite ("EBS")) system integration for order/shopper/catalog/inventory/promotion processing.

Figure 12:
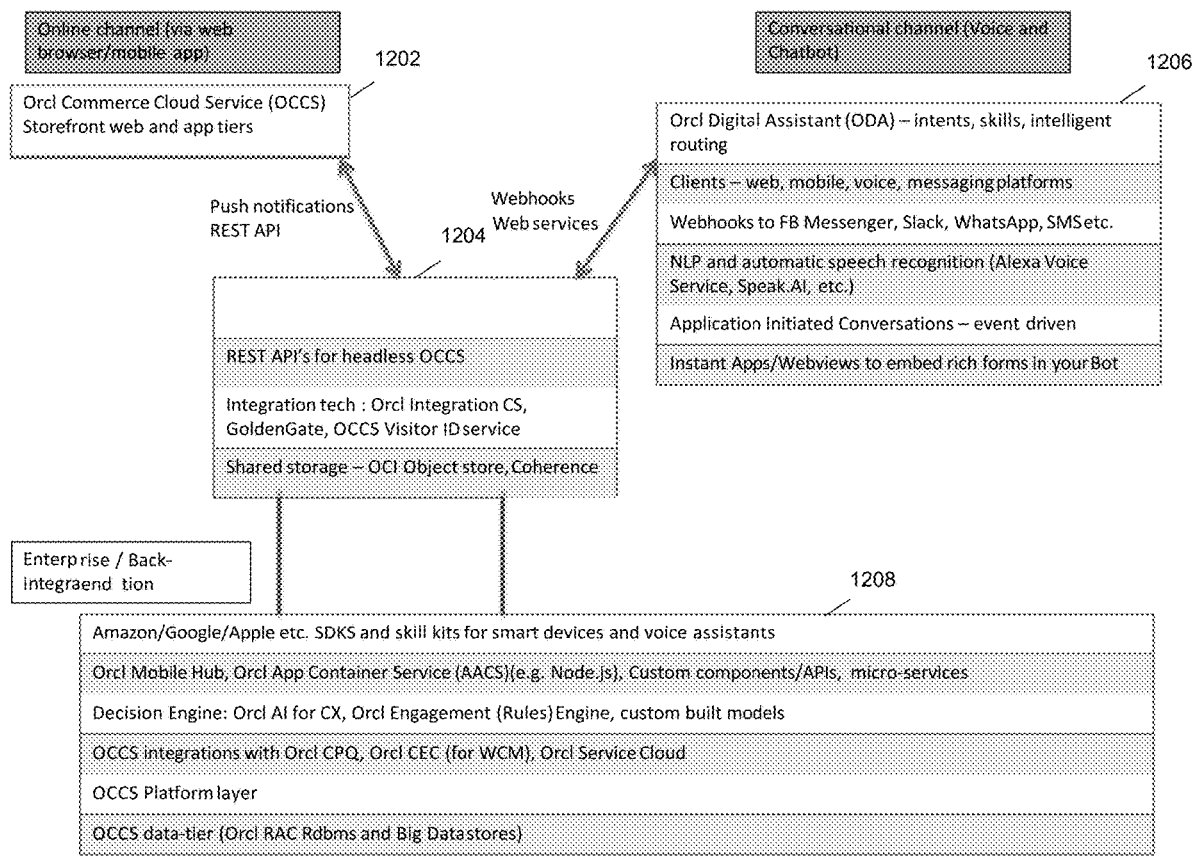
FIG. 12 illustrates a sample architecture, according to an example embodiment.

FIG. 12 illustrates a sample architecture according to an example embodiment. The illustrated architecture includes cloud service 1202, which can include Oracle® Commerce Cloud Service storefront web and application tiers. For example, cloud service 1202 can represent an online or web channel. Processors 1206 can communicate with cloud service 1202 (e.g., using push notification APIs) and can communicate with digital assistant and messenger 1206 (e.g., using a webhook and/or web services). In some embodiments, digital assistant and messenger 1206 can include Oracle® Digital Assistant, clients (e.g., web, mobile, voice, messaging platforms), webhooks to FB Messenger, Slack, WhatsApp, SMS, and the like, NLP and speech recognition services (e.g., Alexa Voice Service, Speak.ai, and the like), Application initiated conversations (e.g., event driven), and/or Instant Apps/webviews that can be used to embed rich formats, such as in chat windows. For example, digital assistant and messenger 1206 can represent a conversational channel (e.g., voice and/or chat).

In some embodiments, processors 1204 can include pattern recognition software such as Apache Kafka, Oracle® Cloud Infrastructure ("OCI") Streaming Service, Oracle® Streaming Analytics, and the like, REST APIs for headless OCCS, Integration technologies (e.g., Oracle® Integration CS, GoldenGate, OCCS Visitor ID service, and the like), and/or shared storage (e.g., OCI object store, Coherence cache, and the like). Processors 1204 can communicate with back-end 1208. In some embodiments, back-end 1208 can include skill sets for smart devices and/or voice assistants (e.g., software development kits (SDKs) and/or libraries for Amazon, Google, Apple, and any other SDKs for smart devices and/or voice assistants), Oracle Mobile Hub, Oracle Application Container Service (e.g., using Node.js), custom components/apps, and/or microservices, a decision engine (e.g., Oracle AI for CX, Oracle Engagement Engine, and/or custom built models), OCCS integration, OCCS platform layer, and/or OCCS data-tier (e.g., Oracle RAC RDBMS, and big data stores).

Figure 13:
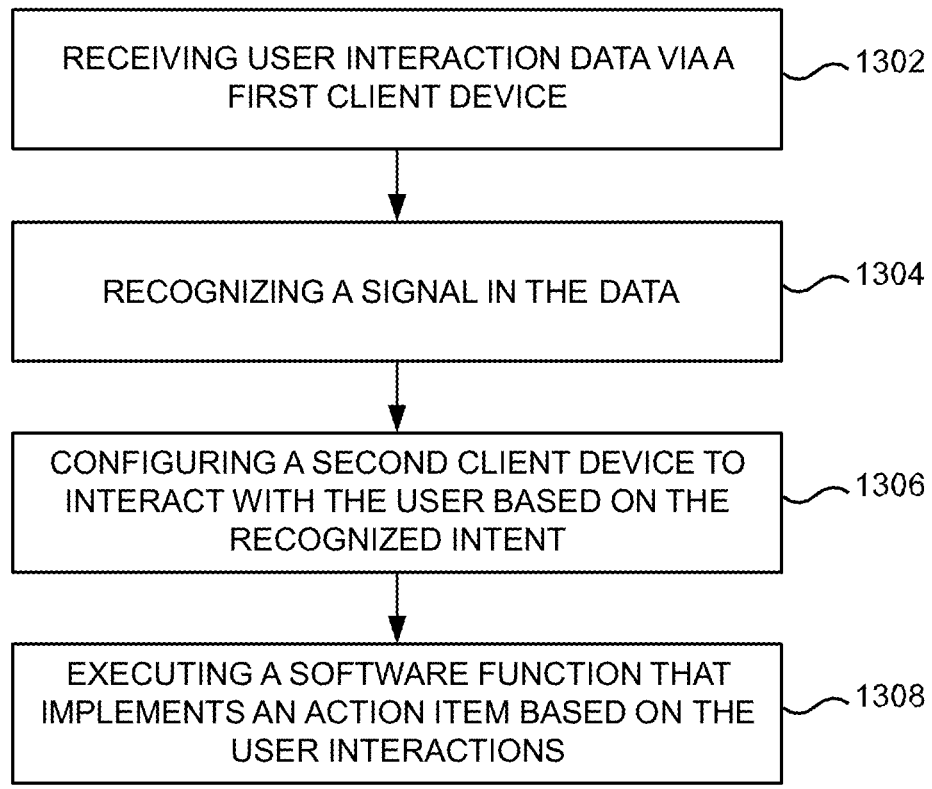
FIG. 13 illustrates a flow diagram for triggering a user interaction with a device based on a detected signal, according to an example embodiment.

FIG. 13 illustrates a flow diagram for triggering a user interaction with a device based on a detected signal, according to an example embodiment. In some embodiments, the functionality of FIG. 13 can be implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIG. 13 can be performed by one or more elements of system 100 of FIG. 1 and/or system 200 of FIG. 2.

At 1302, data associated with a user interaction can be received, where the data can include input that was received from the user at a first device. For example, the first user device can be a smartphone, tablet, smart earbuds or laptop, and the interaction can be a user interacting with a native application or a web browser. In some embodiments, the received data is a stream of user data that indicates a user's web activity.

At 1304, a signal is recognized based on the received data about the user such as a voice command. For example, the signal can indicate an intent, such as an intent to buy a product or service, or any other suitable intent. In some embodiments, the signal can also indicate value in a secondary interaction with the user, such as a problem that can be navigated with the user over another means of interaction. For example, the recognized signal can be a dwell time on a webpage that meets a criterion. In some embodiments, the stream of user data can be a real-time stream of web data based on the user's interactions with a web browser, and the recognized signal can be recognized within the real-time stream of user data.

At 1306, a second device is configured to interact with the user based on the recognized signal, the interacting including an audio interaction or a visual interaction. For example, a second device such as a smart speaker or a smartphone can be configured to interact with the user. The smart speaker or smartphone can be configured to interact with the user over voice, using a visual display, and/or a combination of these.

In some embodiments, the first device and second device are communicatively coupled with a server that configures the second device to interact with the user based on the recognized signal such as a voice command. For example, the first device can be a smart phone, smart earbuds, or tablet and the second device can be a smart speaker or smartphone. In some embodiments, the configuring of the second device to interact with the user based on the recognized signal occurs in real-time while the user is interacting with the first device (e.g., a web browser on the first device).

In some embodiments, an audio interaction with the device can include an audio output from a speaker and audio input from a microphone or an audio interaction with smart earbuds that include a speaker and a microphone. In some embodiments, a visual interaction with the second device can include display of a user interface configured based on the recognized signal and user input received on the user interface or audio input received at a microphone.

At 1308, a software function that implements an action item can be executed, where the execution of the software function is based on a second input from the user received at the second device and the second input triggers the software function. For example, where the recognized signal indicates a purchasing intent, the software function can be completing the purchase of a good or service. In some embodiments, the completion of the purchase of the good or service can be based on receiving input at the second device (e.g., the smart speaker) or the first device (e.g., smart earbuds) after interacting with the user about the good or service. In some embodiments, the executed software function that implements the action item achieves one or more of adding an item to a shopping cart, executing a database batch process, initiating a return or exchange of an item, and tracking the status of a shipment or order.

Some embodiments trigger a user interaction with a device based on a detected signal. For example, a user can initiate an interaction with a digital assistant, for example through a text-based chat channel or a conversational channel, or a user can interact with a webpage, web application, or any other suitable web presence (e.g., a web channel interaction). Based on this interaction, a signal can be detected by some embodiments, such as through the use of machine learning, rules, or other techniques. For example, through a chat or conversation with the user, a chatbot can identify a signal in the user interaction, or a configured server can identify a signal in a user's web actions. In some embodiments, the signal can indicate a user's interest in purchasing a product or service.

In some embodiments, based on the user's interactions on a first client device and one or more detected signals, a second user device can be configured to interact with the user in a different channel. For example, a signal identified for a text-based chat interaction on first user device (e.g., smartphone or smart earbuds) can be used to trigger interaction with the user on a tablet or smartphone (e.g., a display-based interaction) or using a smart speaker (e.g., conversational interaction). In another example, a signal identified in a user's web actions using a first user device (e.g., tablet) can be used to trigger a text or dialogue-based interaction (e.g., on a separate client device, such as a smartphone) or an interaction using a smart speaker (e.g., conversational voice interaction).

Some embodiments can trigger user interaction on a separate client device in a different channel to improve user experience. For example, some users may prefer having certain interactions on certain devices (e.g., selecting from a list of service options on a tablet rather than a smartphone, navigating a menu based on a conversation with a smart speaker rather than a text-based chat on a smartphone or tablet, and the like). Embodiments leverage the proliferation of client devices to interact with users in a preferred manner, and thus improve the user experience.

Figure 14A:
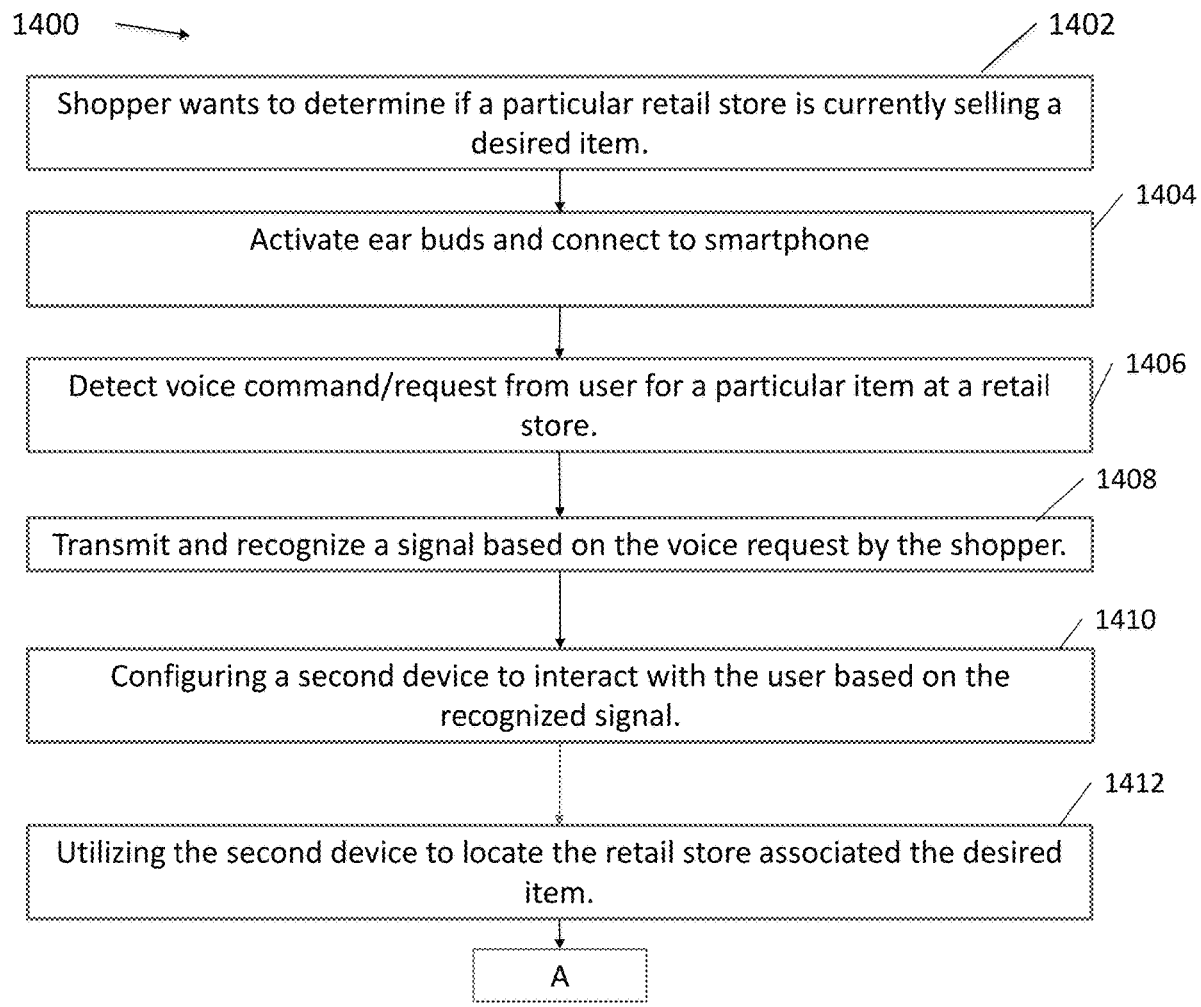
FIGS. 14a-14c illustrate a flow diagram for a personalized audio-assisted shopping, according to an example embodiment.
Figure 14B:
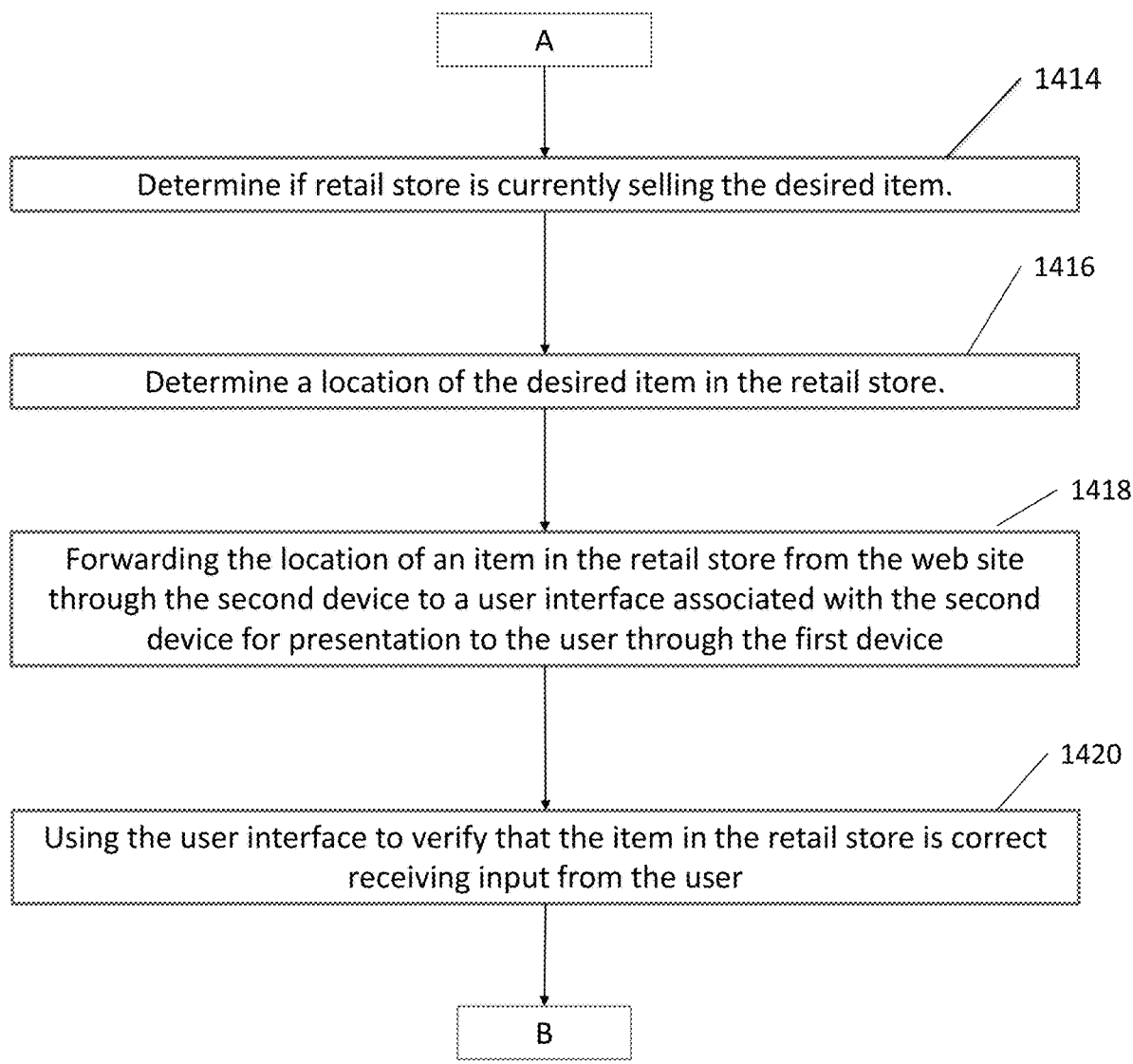
Figure 14C:
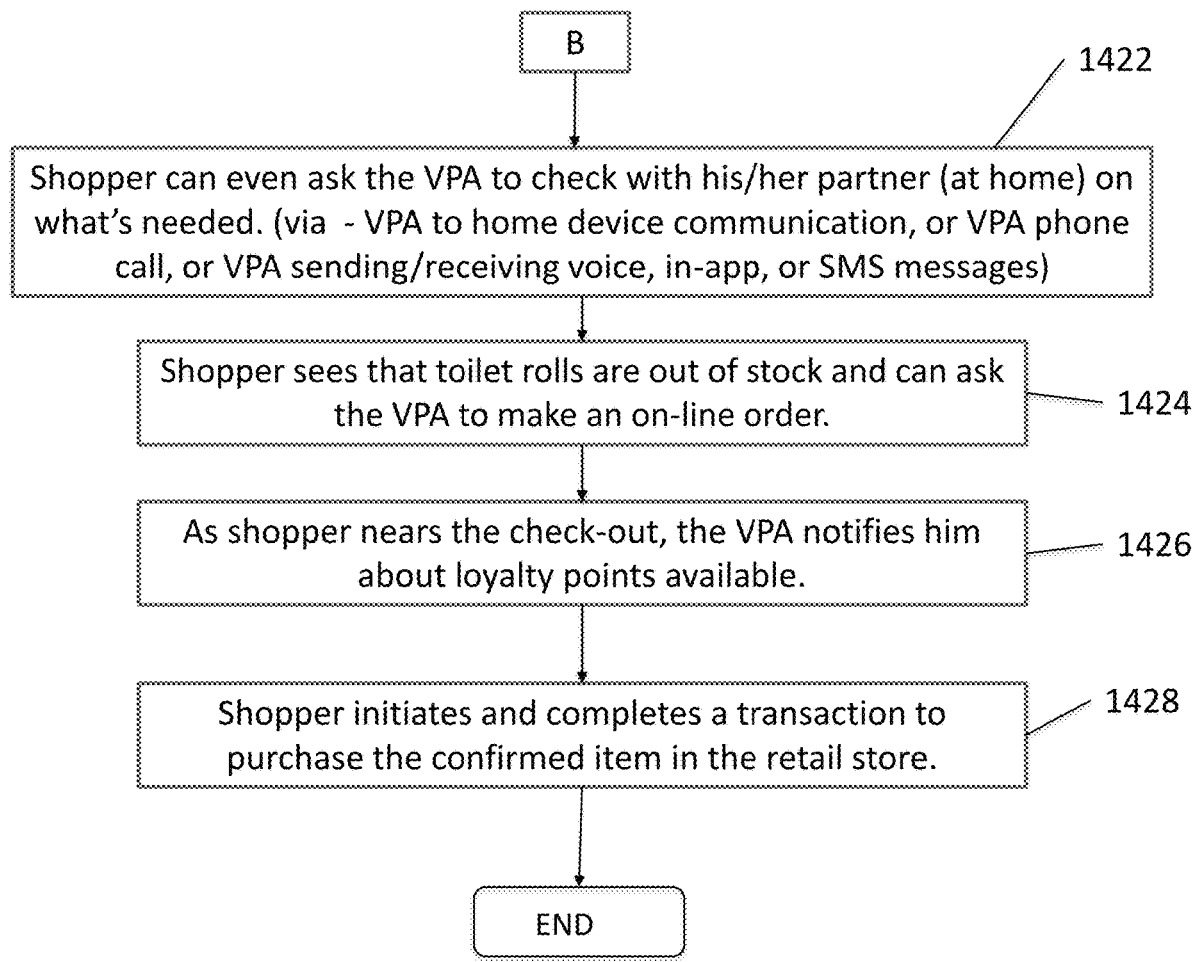

FIGS. 14a-14c illustrate a flow diagram for personalized audio-assisted shopping, according to an example embodiment. In some embodiments, the functionality of FIGS. 14a-14c can be implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In one or more embodiments, the functionality of FIGS. 14a-14c can be implemented in and performed by one or more elements of the system 100 of FIG. 1, the system 200 of FIG. 2, and/or combinations of features described in this disclosure.

Audio-Assisted Commands and Device Integration Embodiment

In FIGS. 14a-14c, a method 1400 is illustrated for processing voice commands where the audio signals are detected, translated into digital signals (voice commands), and communicated between multiple devices. In one example, the method 1400 may be configured to operate as personalized audio-assisted shopping technique. In one embodiment, the method 1400 is implemented to integrate a voice assistant device to an intelligent chatbot/digital assistant device for communicating with third-party web services. For example, verbal commands and requests are received, detected, identified, converted to digital form and processed into a corresponding command(s) or function(s) that may be performed via cloud-based services over network communications. In one embodiment, the method 1400 operates on verbal and audio interactions with an earbud device that includes at least a speaker and a microphone, and includes a wireless transceiver that communicates with a smart device.

The method 1400 is initiated, at block 1402, when a user/shopper wants to determine if a particular retail store is selling a desired item and it is currently in stock. For example, assume that the shopper is on vacation and the shopper wants to determine if a grocery store near the shopper's hotel is currently selling a type of craft beer that the shopper usually purchases at the shopper's grocery store in the shopper's home town.

At block 1404, a first device (e.g., earbuds) is activated to receive and detect audio signals via a microphone. For example, the device may be activated by the shopper installing the first device (puts the earbuds in his/her ears), which turns on the earbuds and/or communicatively connects the earbuds to a nearby smart phone/device. It is to be understood that the first device is capable of interacting with a second device such as the smartphone. As discussed above, the second device is equipped with a built-in, virtual private assistant ("VPA") which can be used for speech recognition and natural language understanding ("NLU") functionality. Examples of a virtual private assistant can include Amazon/Alexa Voice Services, Google Assistant, and the like. Furthermore, the second device can include a virtual private assistant app. and Wi-Fi, mobile data, Bluetooth®, and GPS location enabled services. In one embodiment, the method 1400 implements connectivity with and use a virtual private assistant associated with the second device to convert the voice request to text. The text may then be transmitted to a digital assistant, associated with the retail store's web site as discussed below.

At block 1406, the shopper interacts with a smart speaker that is part of the earbuds (e.g., the first device) and issues a voice command/request that is detected by the earbuds as an audio signal. For example, the voice command may be a request or question that asks (sends a voice request) if a particular retail store carries a desired item (e.g., a particular brand of craft beer) and, if the retail store does carry the desired item, where is the physical location of the desired item in the retail store so that the shopper can locate the desired item from the retail store.

At block 1408, the detected voice command/request is transmitted from the earbud to the second device as a signal. The signal is recognized by the VPA of the second device based on the received data about the user such as the voice command/request. For example, the signal can indicate an intent, such as an intent to buy a product or service, or any other suitable intent. As discussed above, especially with respect to FIG. 4, the data associated with a user interaction (e.g., voice request) can be received, where the data can include input that was received from the user at the second device. For example, the second user device can be a smartphone, tablet, smart earbuds or laptop, and the interaction can be a user interacting with a native application or a web browser.

In some embodiments, once a signal is recognized in a data stream generated by a user interacting with a client device such as the smart earbuds or a web enabled device, a user interaction with the second client device (a smartphone or the like) can be triggered. For example, the second client device can be proximate to the user. In some embodiments, a user can interact with the second client device (e.g., a smartphone) to access a webpage or interface with a web application (e.g., implemented by (OCCS)). The second client device (and optionally a browser/application running) can be assigned a visitor_id1 value (e.g., from the Visitor ID service of OCCS). In some embodiments, a signal can be recognized in the stream of data received from the second client device (e.g., indicative of the user's interactions with the webpage or web application). Based on the recognized signal (e.g., intent), a digital assistant (e.g., Oracle® Digital Assistant) can be invoked, such as after receiving consent (e.g., based on a web message/notification sent to the second client device). In some embodiments, the original visitor_id1 parameter can be passed to the digital assistant.

As discussed above, a user signal (e.g., consumer intent which indicates value in a channel of interaction, such as consumer need for shopping assistance) can be identified, for example by utilizing pattern recognition in a user data stream. Identified signals can be then used to trigger another channel of interaction, such as between a digital assistant and the user. For example, a user interacting with an enterprise webpage on a second client device using a second channel (e.g., smart phone using a display and user interface) can be prompted to communicate with a first client device using a first channel (e.g., smart earbuds using a voice channel) based on a detected signal that the user has questions or is experiencing problems while interacting over the first channel.

Furthermore, in some embodiments, one or more of artificial intelligence (AI), machine learning, pattern recognition, and/or defined rules can be used to detect a signal in a user stream of data and trigger an interaction with a client device. In some embodiments, subsequent interactions with the digital assistant (e.g., online or voice) can be reflected on both the online/web channel and in the digital assistant channel (e.g. the online channel can be made aware of a simultaneous verbal help request to a proximate smart speaker). The online or web channel an also be configured to display other useful information, such as a Frequently Asked Questions ("FAQ") webpage, a link to a product detail webpage ("PDP"), and/or a review webpage, to assist in the user interaction. Embodiments can also mirror/connect updates of interfaces (e.g., graphical user interfaces ("GUIs") across online devices (e.g., smartphone, tablet, laptop, desktop, a smart speaker with a screen, a wearable device with a screen, and the like) synchronously—for visual communication to the consumer—and quicker and easier ingest of information (e.g., visual and verbal).

With respect to block 1410, in some embodiments, the first device and second device are communicatively coupled with a server that configures the second device to interact with the user based on the recognized signal such as a voice command. For example, the first device can be a smart phone, smart earbuds, or tablet and the second device can be a smart speaker or smartphone. In some embodiments, the configuring of the second device to interact with the user, based on the recognized signal, occurs in real-time while the user is interacting with the second device (e.g., a web browser on the second device).

In some embodiments, an audio interaction with the device can include an audio output from a speaker and audio input from a microphone or an audio interaction with smart earbuds that include a speaker and a microphone. In some embodiments, a visual interaction (augmented experience) with the second device can include display of a user interface configured based on the recognized signal and user input received on the user interface or audio input received at a microphone.

More particularly, as discussed above in relation to FIG. 7, a user can communicate with a smart speaker or a smart earbud, such as ask a question. The smart speaker (or smart earbud) can in turn request voice stream service, such as from a voice cloud service. The voice cloud service can request service from a digital assistant cloud service. For example, a configured "skill" (or specialized chatbot) can be configured to service the user's utterance (e.g., ask a question).

As will be discussed in greater detail later in relation to block 1412, a webhook (e.g., webhook uniform resource indicator ("URI")) can be used to communicate with a digital assistant. As discussed above in relation to FIG. 7, the webhook can be used to receive a response from the digital assistant at the digital assistant cloud service. The response can be transmitted from the digital assistant cloud service to the voice cloud service, and ultimately to the smart earbuds (or the user's smartphone). The smartphone can then respond to the user's utterance (e.g., ask a question). In some embodiments, the flow from FIG. 7 can be used to interact with a user via a smart speaker (or smart earbud) after receiving consent from the user for interaction on a new client device (e.g., based on a detected signal in a user stream of data and a web push message/notification).

Returning to block 1410, in some embodiments, one or more skills can be configured to implement the communication between a digital assistant (e.g., Oracle® Digital Assistant) and a voice service and/or third-party device (e.g., Alexa voice service/smart speaker (or smartphone), and any other suitable service and device). For example, the one or more skills can process requests from the voice service platform/third-party device (e.g., parse requests, such as HTTP JSON requests from the Alexa voice service platform), communicate with intelligent chatbots via webhook, and build responses to the requests (e.g., build JSON responses that can be consumed by the voice service/third party device, such as the Alexa Voice Service (AVS) and smart earbuds (or smartphone)).

In some embodiments, the digital assistant and voice service/third-party device platform can both use a JSON payload to exchange messages. The format of the messages may be different, and the configured skill can be used to receive and parse a request (e.g., coming from the voice service/third-party device). In some embodiments, the one or more skills can transform the payload from a first format (e.g., format used by the voice service/third-party device) to a second format (e.g., used by the digital assistant). The payload can be sent to an intelligent bot, and it can contain message content and additional information about the user. In some embodiments, the payload can also contain the routing that allows the bot response to be returned (e.g., to the third-party device and the user interacting with the third-party device). The one or more configured skills, which in some embodiments can be a configured application for interacting with the voice service/third-party device platform) can be deployed to a network accessible node (e.g., Oracle® Application Container Cloud Service).

In some embodiments, the voice service/third-party device platform (e.g., Alexa voice service platform) can include APIs for interfacing with the platform. For example, the platform APIs can include speech-to-text and text-to-speech transformation functionality. In another example, the APIs can be used to build one or more skills for interacting with the platform. Embodiments utilize the platform APIs to interact with third-party devices (e.g., an Amazon Echo/Google Home smart-speaker, smartphone or other client device) that includes connectivity with and use the third party service to convert the voice request to text. The text may then be transmitted to a digital assistant, remote device or other system as a command or requested function, etc.

In some embodiments, skills for a third-party device platform can be configured to interact with the digital screen of the third-party device (e.g., smart speaker with a screen, smartphone, tablet, smart television, smart home device with a screen, and the like). In some embodiments, a software development kit ("SDK") (e.g., Alexa Presentation Language ("APL") SDK) can be utilized to configure skills to control/adjust the visual display of the third-party device. Configuring a visual skill can include one or more of defining/selecting one or more templates, playing a video (e.g., using a built-in video application), and configuring content for display on the third-party device. Third-party device platform APIs can similarly be used to interact with a display of the third-party device.

In some embodiments, displays on multiple devices can be configured simultaneously (e.g., multiple client devices can be configured to display the same or similar content). For example, a skill for a third-party device (e.g., smart speaker with a display screen or a smartphone) can be configured to control the display of the third-party device. In addition, a second client device with a display (e.g., client device displaying a webpage, such as a smartphone, desktop, or tablet) can be configured, for example using an API that controls the content of the display (e.g., the content of a website displayed by the second client device). For example, the display of a website implemented by Oracle® Commerce Service can be adjusted using Oracle® Commerce Cloud REST APIs. For example, Store API endpoints can provide access to a storefront, Admin API endpoints can provide access to administrative functionality on the administration server, Agent API endpoints can provide access to agent functionality on the administration server, and Social Wish Lists API endpoints can be used to configure wish list features. In some embodiments, one or more Oracle® Commerce Cloud REST APIs can be used to control/adjust the display of a webpage, and thus the display of the second client device.

In some embodiments, the skills/APIs for the third-party device platform and the APIs for controlling/adjusting the display of a second client device can be used in combination. For example, the screens for the third-party device (e.g., smart speaker with a display screen or a smartphone) and the second client device (e.g., smartphone, tablet, laptop, or desktop displaying a website) can be controlled simultaneously, and the content displayed on these devices can be coordinated. In some embodiments, the screen for the third-party device and the screen for the second client device can be configured to display the same or similar content. In some embodiments, a third-party device can include a device with a screen (e.g., smart speaker with a screen or a smartphone) or a device configured to control a screen (e.g., Google Chromecast, Amazon Firestick, and the like).

With reference to block 1412, as a result of the shopper sending a voice request to the VPA regarding whether or not a retail store carries the desired item, the VPA of the second device (e.g., smartphone) interacts with the digital assistant which, in turn, interacts with the OCCS of the retail store. This interaction includes a command/request to locate the retail store of interest to the shopper and forward the store location information to the shopper, as will be discussed in greater detail below.

With reference to FIG. 14*b*, the process continues. At block 1414, the VPA/digital assistant/OCCS interaction may also include a request to determine an availability of the desired item at the retail store (e.g., from an inventory request via the retail store's website or database). Upon receiving a reply to the request, the reply includes information that is provided to the shopper of whether or not the retail store is currently selling the desired item, as will be discussed in greater detail below.

At block 1416, the VPA/digital assistant/OCCS interaction also can retrieve and provide information to the shopper of the location of the desired item in the retail store such as directions relative to a current location of the shopper (based on the location of the smart phone) and/or aisle identification information. This will be discussed in greater detail below.

At block 1418, the location of an item in the retail store is forwarded from the OCCS to the digital assistant to a user interface associated with the second device for presentation to the user through the first device. In one embodiment, the location information is translated into an audio/verbal instruction that is output via the speakers of the earbuds (the first device).

In another embodiment, as the shopper walks down the aisles of the retail store (e.g., the grocery store), the VPA/digital assistant/OCCS interaction informs the shopper of the location of the desired item (e.g., the desired brand of craft beer) on the particular aisle in the retail store. Informing the shopper includes generating audio verbal/voice signals that provide location and/or directional information via the earbuds. A unique aspect of the present system is that the shopper does not have to actually be in the retail store for the VPA/digital assistant/OCCS interaction to inform the shopper of the location of the desired item on the particular aisle in the retail store. The VPA/digital assistant/OCCS interaction can provide the location of the desired item in the retail store, the shopper then can simply go to the retail store, and locate the desired item in the retail store.

In one embodiment, the VPA/digital assistant/OCCS interaction is able to provide the shopper with the information about the retail store (e.g., does the retail store carry the desired item) and the location of the desired item in the retail store by implementing the previous system features, as discussed above. Regarding the voice analytics, as discussed above in relation to FIG. 4, based on the processing and analytics performed by stream analytics 410, one or more actions can be performed. For example, module 416 can perform an interaction with an electronic device/user, such as transmit a web push message to the electronic device based on a recognized pattern within a stream of events associated with the electronic device and/or contextual data associated with a user of the electronic device meeting a contextual criterion. In some embodiments, the web push message can prompt the user to interact with a new client device (e.g., smart speaker, smartphone or the like), where user consent is received via an input (based on the web push notification) to interact with the new client device.

As discussed above, in some embodiments, recognized pattern(s) and/or contextual data can be used to trigger user interaction on a new client device over a new channel. For example, a signal that indicates a user experiencing a technical issue can be detected in a user stream (e.g., stream of web data). In some embodiments, the user stream can be generated by a user navigating a website of a commerce entity on a smartphone. Based on the detected signal, the user can be prompted to interact with a proximate smart speaker or the smartphone. For example, a web push message/notification can be transmitted to the user's smart earbuds or smartphone, and after receiving consent from the user based on the web push message/notification, the user interaction on the smart speaker or the smartphone can be triggered.

Web push messages/notifications can be selectable (clickable) messages, sent to the user's/visitor's/subscriber's browsers (e.g., running on a client device, such as a smartphone) and can appear next to the task bar (or in the display of a mobile device). These messages/notifications can be "browser based", which means they can be accessible across different platforms and devices. In addition, whether users are connected through mobile devices, tablets, or desktops, web push messages and/or notifications can reach their devices in real-time. In addition, a web push notification can be displayed when the web browser is browsing any website. In some embodiments, the web push notifications can include selectable actions, such as hyperlinks, and rich media. Web push messages/notifications can be particularly effective, for example because they can be brief and can be delivered in real-time to increase user engagement and customer retention. In some embodiments, web push messages/notifications can be used to trigger a user interaction on a separate client device based on receiving consent from the user.

Regarding the interaction between the VPA of the second device (e.g., the smartphone) and the OCCS of the retail store, as discussed above, embodiments can be implemented for a merchant's e-commerce web presence, such as a website. Consider a visitor to a merchant's website (e.g., using the OCCS, with the OCCS client configured as a PWA). The visitor's consent and opt-in to receive push notifications or requested information regarding a product of interest to the visitor from the site can be retrieved based on a message to the visitor's electronic device such through the VPA of a smartphone. For example, the opt-in can be secured initially based on messaging, and subsequently web push messages can be sent to the user/electronic device based on this initial opt-in. In some embodiments, the opt-in must be secured before the visitor's electronic device can receive push messages. Thereafter, based on predetermined detection patterns of the visitor's behavioral events (e.g., detected signal of intent in the user's data stream) and, optionally, based on the visitor's context (e.g., past behavior, geolocation, device, audience, time of day, weather, demographics etc.), one or more push messages or information regarding a product of interest to the visitor can be transmitted to the visitor's electronic device, which can be configured to display such a notification (e.g., in a mobile web browser in real-time). Such functionality can avert missed opportunities for the interaction with the user, reduce friction with the shopping experience, and provide other tangible benefits that flow from better understanding a visitor's intent by way of behavioral analytics.

As discussed above, embodiments leverage user interaction through chat or voice, such as with a smart speaker, smart earbuds or other devices configured with a speaker and microphone (e.g., laptop), where a digital assistant can be used to provide the chat or voice services. As discussed above in relation to FIG. 5, communication between a digital assistant and connected devices is discussed. For example, digital assistant 502 can interact with server 504 and web application 506. In some embodiments, the functionality illustrated in FIG. 5 can be triggered based on a detected signal in a client data stream (e.g., detected/recognized based on the functionality illustrated in FIG. 3). Digital assistant 502 can send a request, such as a POST request, with variables and callback to web server 504. For example, the request can include input variables and a callback URL. Web server 504 can set the parameters for invoking a web application (e.g., web application 506). The request response from web server 504 to digital assistant 502 can include the set parameters (e.g., a webview URL with the set parameters). Digital assistant 502 can then call web application 506 (e.g., using the webview URL) and display the web application in a webview. Web application 506 can then interact with digital assistant 502, such as by sending data (e.g., JSON data) to the digital assistant.

In relation to FIG. 6, device communication for a client application and a digital assistant is further discussed. Embodiments can be implemented with a number of client-side applications, such as messaging applications on a user's client device (e.g., smartphone). For example, a user device (e.g., a smartphone) with a messenger application can communicate with a messenger platform, and the messenger platform can then communicate with digital assistant.

As discussed above in FIG. 5, the digital assistant 502 interacts with server 504 and web application 506. It is to be understood that the web application 506 is a web application managed by or managed on behalf of the retail store that carries the desired item (e.g., a particular brand of craft beer). A webhook (e.g., webhook uniform resource indicator ("URI")) can be created by the web application and used to communicate with a digital assistant. In particular, a webhook for the desired item can be created and returned to the digital assistant 502. The webhook will contain information regarding whether or not the retail store carries the desired item, the aisle in the retail store where the desired item is located, and the location of the desired item in that aisle. It is to be understood that a retailer's in-store management system (or retailer's inventory management system) can be used to provide the webhook to the digital assistant, as discussed below.

Figure 15:
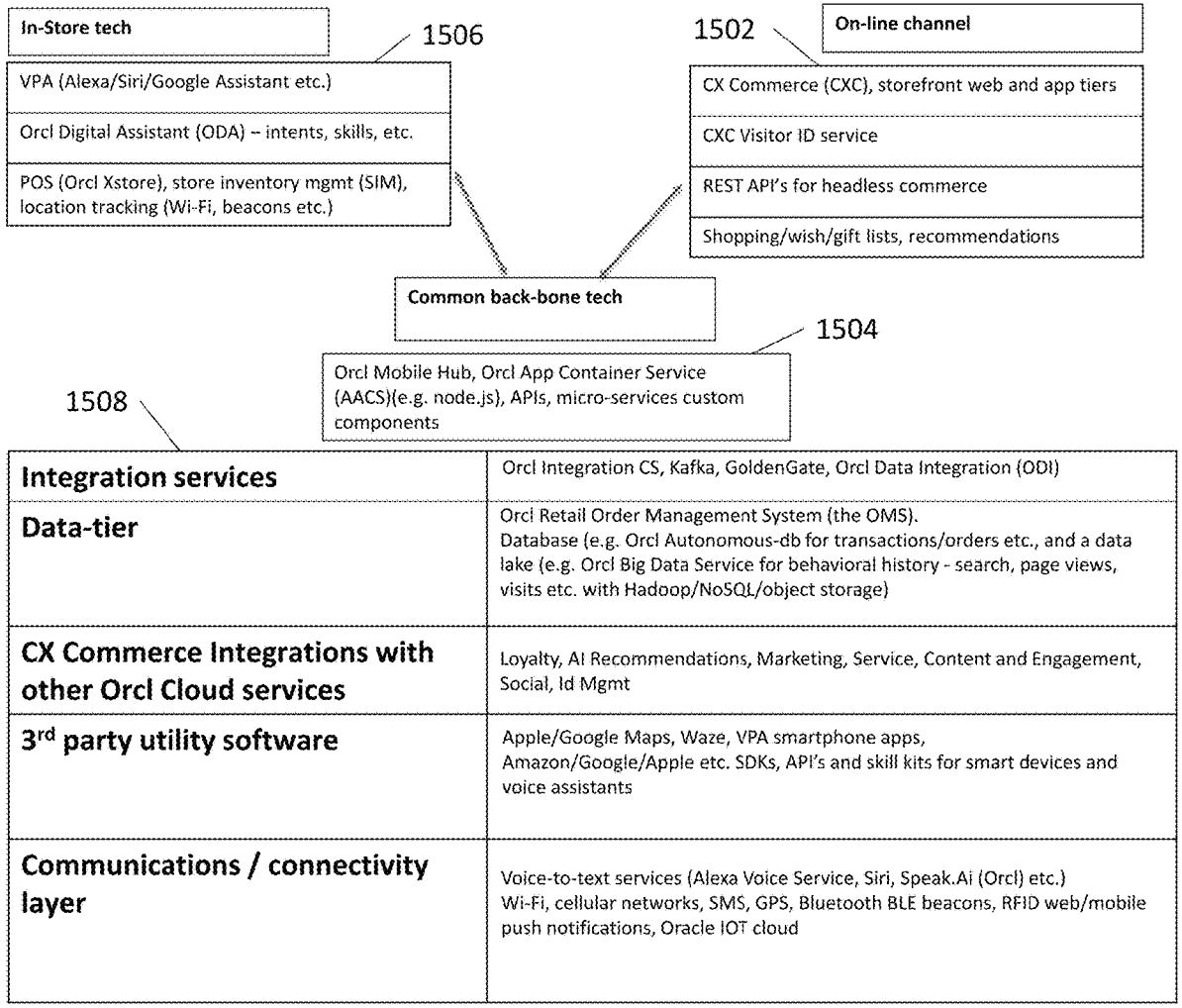
FIG. 15 illustrates another sample architecture for use with a personalized audio-assisted shopping, according to an example embodiment.

FIG. 15 illustrates a sample architecture according to an example embodiment for use with a personalized audio-assisted shopping especially in relation to how the information about the retail store (does the retail store carry the desired item) and the location of the desired item in the retail store is obtained and forwarded to the digital assistant. It is to be understood that after the information is received by the digital assistant, the sample architecture, as discussed with respect to FIG. 12 can be used to forward the information from the digital assistant to the second and first devices (e.g., smartphone and smart earbuds, respectively).

As shown in FIG. 15, the illustrated architecture includes cloud service 1502, which can include Oracle® Commerce Cloud Service (OCCS) storefront web and application tiers. For example, cloud service 1502 can represent an online or web channel. A VPA (associated with the second device such as a smartphone and as an example of the In-store technology 1506) is used by a shopper (or remotely by the shopper if the shopper is not actually located within the retail store) to communicate with OCC (via REST API calls). The OCC can then invoke REST API's/webhooks/web services to external systems like in-store retail inventory management system and have the results (e.g., items, item locations, etc.) returned as a response. The information is then forwarded to the cloud service 1502 as a webhook. The cloud service 1502 can then communicate with a digital assistant and messenger (e.g., using a webhook and/or web services). In some embodiments, the in-store technology 1506 can include Oracle® Digital Assistant, VPA (Alexa/Siri/Google Assistant, and the like), POS (Oracle Xstore), store inventory management (SIM), and location tracking (Wi-Fi, beacons, etc.)

In some embodiments, processors 1504 can communicate with back-end 1508. In some embodiments, back-end 1508 can include skill sets for in-store management systems that are configured to accomplish specific tasks (e.g., integration services such as Oracle Integration CS), data-tier (e.g., Oracle Retail Order Management System), commerce integration services (e.g., customer loyalty programs and customer identification management), Third party utility software (e.g., VPA smartphone apps, SDKs, and API's and skill kits for smart devices and voice assistants), and a Communication and Connectivity layer (e.g., voice-to-text services, Wi-Fi, cellular networks, SMS, GPS, Bluetooth®, and web/mobile push notification).

In some embodiments, as discussed above, a digital assistant (e.g., Oracle Digital Assistant) interacting with a client in a dialogue or verbal mode, can request OCCS (e.g., via REST API interface) to add/remove items to/from a cart (or wish-list), submit/cancel/update an order, return or exchange an order, track the status of an order, request order history, request current orders, update a shopper profile, and any other suitable function/action.

As discussed above, after the cloud service has communicated with a digital assistant and messenger (e.g., using a webhook and/or web services), the digital assistant, then forwards the information to the VPA of the second device (e.g., smartphone) for subsequent presentation to the shopper through the first device (e.g., smart earbuds).

Returning back to FIG. 14*b*, with respect to block 1420, once the digital assistant (ODA) sends and displays the desired item information to the shopper, the shopper can review the desired item information to determine if the information sent by the ODA is, in fact, the information on the item that the shopper is actually interested in purchasing. For example, the ODA can send an image of the desired item that can be viewed on the display of the second device (e.g., smartphone). The ODA can also send audio information (e.g., information describing the item of interest) to the shopper through the second device (e.g., smartphone) to the first device (e.g., smart earbuds). In either case, the shopper can then verify if the information sent by the ODA to the shopper is information on the item that the shopper is actually interested in purchasing.

Regarding block 1422, while still shopping in the retail store, assume that the shopper wants to contact his/her partner and find out from the shopper's partner if the partner needs anything from the retail store. In this case, the first device (e.g., smart earbuds) is used to interact with the second device (e.g., smartphone) in order to request that a voice assistant (e.g., Siri or Alexa) send a message, as discussed above. The shopper then makes a voice request to the voice assistant, telling the voice assistant to whom the shopper wants to communicate with, and what the shopper wants to say. The voice assistant then generates and sends the message to the desired recipient of the message. Typically, if the recipient of the message responds to the shopper's message, the recipient's message is then sent back to the shopper along with a notification (e.g., a chime) that shopper has received a message from the recipient. If the recipient's message contains items that the partner wants from the retail store, the shopper can simply forward voice requests regarding these newly added items through the first device to the second device. If the retail store carries these newly added items, the locations of these newly added items will then be transmitted back to the shopper, as discussed above.

Regarding block 1424, assume that the shopper is informed that the retail store does have a desired item (e.g., toilet paper) in stock, but, as part of the shopper's weekly shopping, the shopper goes to the retail store to discover that the desired item is now out of stock at that retail store. The shopper can use the first device (e.g., smart earbuds) to interact with the second device (e.g., smartphone) to place an on-line order for the out-of-stock item. In particular, the second device interacts with the digital assistant (ODA), as discussed above. The digital assistant then interacts with a cloud-based service (e.g., the Oracle Commerce Cloud (OCC)). An API call is sent from the digital assistant to the OCC in a headless mode thereby invoking a REST API from the OCC. In this manner, no screens on the second device are involved. The on-line order is placed and subsequently shipped to the shopper.

Regarding block 1426, once the shopper has obtained the desired item (or items), the shopper proceeds to the check-out area to pay for the item. In this step, the second device interacts with the digital assistant, as discussed above. The digital assistant can then interact with the Oracle Commerce Cloud (OCC). An API call is sent from the digital assistant to the OCC. It is to be understood that in one embodiment the OCC may be integrated with a customer loyalty service such as Oracle Loyalty Cloud Service or some other similar type of customer loyalty service. In particular, this integration enables a retail store merchant to use the loyalty program features provided by Oracle Loyalty Cloud Service with an OCC store. Shoppers can thus accrue and redeem Oracle Loyalty Cloud program points when they spend at an OCC store. In this manner, once the information about the location of the desired item in the retail store is forwarded to the shopper, the shopper can also be informed that the shopper will also earn customer loyalty points for purchasing the desired item.

Regarding block 1428, once the shopper has obtained all of the desired items and been informed as to any customer loyalty points associated with the purchase of the desired item, the shopper can proceed to the check-out area to initiate and complete a financial transaction in order to pay for the desired item. In particular, the shopper can pay for the desired item with cash, credit card, debit card, gift card, loyalty points, and/or the like.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method for processing audio voice requests, wherein the method comprises:

receiving, by a microphone of a first device including smart earbuds, a real-time stream of user data including a voice request associated with a user interaction from a user;

triggering a second device including a smart phone to interact with the user via the smart earbuds based on at least the voice request;

using a virtual private assistant associated with the second device to convert the voice request and the real-time stream of user data to text;

transmitting the text of the real-time stream of user data to a digital assistant of a digital assistant cloud service to recognize the real-time stream of user data including the voice request;

routing, by the digital assistant cloud service, the voice request and the real-time stream of user data to a target skill bot based on at least the voice request;

recognizing a pattern within the real-time stream of user data, where the recognized pattern is indicative of a user intent and is associated with determining a location of a desired item within a retail store and purchasing the desired item from the retail store;

utilizing the second device to locate the retail store, wherein the second device interacts with the digital assistant of the digital assistant cloud service and the digital assistant of the digital assistant cloud service communicates with a web site associated with the retail store;

in response to the second device interacting with the digital assistant, determining that the retail store is currently selling the desired item and the desired item is in stock;

in response to determining that the retail store is currently selling the desired item, determining a physical location of the desired item within an aisle of the retail store from the digital assistant;

forwarding the physical location of the desired item from the web site through the second device to a user interface associated with the second device for presentation to the user through the first device;

causing the first device to inform the user of the physical location of the desired item including the aisle of the retail store;

displaying a prompt on the user interface to verify that the desired item in the retail store is correct by receiving an input from the user; and upon confirming that the desired item in the retail store is correct, initiating and completing a transaction on the desired item in the retail store.

2. The method of claim 1, wherein the method further comprises:
communicatively coupling the first device and the second device with a server associated with the second device that configures the second device to interact with the user based on the recognized pattern; and
after the second device is triggered to interact with the user, configuring the first device and the second device to simultaneously interact with the user.

3. The method of claim 1, wherein the method further comprises:
performing an interaction between the digital assistant, a server, and a web application associated with the web site; and
creating a webhook by the web application, wherein the webhook provides information regarding whether or not the retail store carries the desired item and the physical location of the desired item in the retail store.

4. The method of claim 3, wherein the method further comprises:
forwarding the webhook for the desired item to the digital assistant; and
forwarding the information from the webhook to the second device.

5. The method of claim 1, wherein displaying the prompt on the user interface to verify that the item in the retail store is correct further comprises:
using the digital assistant to send information of the desired item to the user through the second device to the first device.

6. A computing system, the computing system comprising:

a processor; and
a memory storing instructions for execution by the processor, the instructions configuring the processor to:
receive, by a first device including smart earbuds, a real-time stream of user data including a voice request associated with a user interaction of a user, wherein the voice request is received and detected by the first device, and wherein the voice request is associated with determining a location of a desired item within a retail store;
trigger a second device including a smart phone to interact with the user via the smart earbuds based on at least the voice request;
use a virtual private assistant associated with the second device to convert the voice request and the real-time stream of user data to text;
transmit the text of the real-time stream of user data to a digital assistant of a digital assistant cloud service to recognize the real-time stream of user data including the voice request;
route, by the digital assistant cloud service, the voice request and the real-time stream of user data to a target skill bot based on at least the voice request;
recognize a pattern within the real-time stream of user data, where the recognized pattern is indicative of a user intent and is associated with determining a location of a desired item within a retail store and purchasing the desired item from the retail store;
utilize the second device to locate the retail store, wherein the second device interacts with the digital assistant of the digital assistant cloud service and the digital assistant of the digital assistant cloud service communicates with a web site that is associated with the retail store;
in response to the second device interacting with the digital assistant, determine if the retail store is currently selling the desired item and the desired item is in stock;
in response to determining that the retail store is currently selling the desired item, determine a physical location of the desired item within an aisle of the retail store from the digital assistant;
forward the physical location of the desired item from the web site through the second device to a user interface associated with the second device for presentation to the user through the first device;
cause the first device to inform the user of the physical location of the desired item including the aisle of the retail store;
use the user interface to verify that the desired item in the retail store is correct by receiving an input from the user; and
upon confirming that the desired item in the retail store is correct, initiating and completing a transaction to purchase the desired item in the retail store.

7. The computing system of claim 6, wherein the computing system further includes instructions that, when executed by at least the processor, cause the processor to:
communicatively couple the first device and the second device with a server associated with the second device that configures the second device to interact with the user based on the recognized pattern.

8. The computing system of claim 6, wherein the computing system further includes instructions that, when executed by at least the processor, cause the processor to:
perform an interaction between the digital assistant, a server, and a web application associated with the web site; and create a webhook by the web application, wherein the webhook provides information regarding whether or not the retail store carries the desired item and the physical location of the desired item in the retail store.

9. The computing system of claim 8, wherein the computing system further includes instructions that, when executed by at least the processor, cause the processor to:
forward the webhook for the desired item to the digital assistant; and
forward the information from the webhook to the second device.

10. The computing system of claim 6, wherein the computing system further includes instructions that, when executed by at least the processor, cause the processor to:
use the digital assistant to send information of the desired item to a user shopper through the second device to the first device.

11. A non-transitory computer readable medium having instructions stored thereon that, when executed by a processor of a computer, the instructions cause the processor to:
receive a voice request, by a first device including smart earbuds, wherein the voice request is received from a user at the first device;
triggering a second device including a smart phone to interact with the user via the smart earbuds based on at least the voice request;
using a virtual private assistant associated with the second device to convert the voice request to text;
transmitting the text to a digital assistant of a digital assistant cloud service to recognize the voice request;
routing, by the digital assistant cloud service, the voice request to a target skill bot based on at least the voice request;
recognize a signal based on the voice request by the user and determine that the voice request is associated with determining a location of a desired item within a retail store and purchasing the desired item from the retail store;
configure a second device to interact with the user based on the recognized signal;
utilize the second device to locate the retail store, wherein the second device interacts with the digital assistant of the digital assistant cloud service and the digital assistant of the digital assistant cloud service communicates with a web site associated with the retail store;
in response to the second device interacting with the digital assistant, determine that the retail store is currently selling the desired item and the desired item is in stock;
in response to determining that the retail store is currently selling the desired item, determine a physical location of the desired item within an aisle of the retail store from the digital assistant;
forward the physical location of the desired item from the web site through the second device to a user interface associated with the second device for presentation to the user through the first device; and
causing the first device to inform the user of the physical location of the desired item within the aisle of the retail store;
wherein the first device provides verbal directional information to identify the aisle of the retail store.

12. The non-transitory computer readable medium of claim 11, further comprising instructions that, when executed by at least the processor, cause the processor to:
communicatively couple the first device and the second device with a server associated with the second device that configures the second device to interact with the user based on the recognized signal.

13. The non-transitory computer readable medium of claim 11, further comprising instructions that, when executed by at least the processor, cause the processor to:
perform an interaction between the digital assistant, a server, and a web application associated with the web site; and
create a webhook by the web application, wherein the webhook provides information regarding whether or not the retail store carries the desired item and the physical location of the desired item in the retail store.

14. The non-transitory computer readable medium of claim 13, further comprising instructions that, when executed by at least the processor, cause the processor to:
forward the webhook for the desired item to the digital assistant; and
forward the information from the webhook to the second device.

15. The non-transitory computer readable medium of claim 11, further comprising instructions that, when executed by at least the processor, cause the processor to:
based on user interactions on the first device and based on one or more detected signals from the voice request, trigger a different channel on the second device or on a different device to interact with the user.

* * * * *

UNITED STATES PATENT AND TRADEMARK OFFICE
CERTIFICATE OF CORRECTION

| | | |
|---|---|---|
| PATENT NO. | : 12,361,474 B2 | Page 1 of 1 |
| APPLICATION NO. | : 17/038233 | |
| DATED | : July 15, 2025 | |
| INVENTOR(S) | : Trainor | |

It is certified that error appears in the above-identified patent and that said Letters Patent is hereby corrected as shown below:

On the Title Page

On page 2, Column 1, under item (56) Other Publications, Line 4, delete "Assitant" and insert -- Assistant --.

In the Drawings

On sheet 3 of 17, in FIG. 3, Line 7, delete "Connectivitiy" and insert -- Connectivity --, therefor.

On sheet 8 of 17, in FIG. 8, Line 2, under Reference Numeral 804, delete "notifiation" and insert -- notification --, therefor.

On sheet 12 of 17, in FIG. 12, Line 13, delete "integraend tion" and insert -- integration --, therefor.

In the Specification

In Column 1, Line 28, delete "home" and insert -- home. --, therefor.

In Column 1, Line 62, delete "that that" and insert -- that --, therefor.

In Column 6, Line 25, delete "Hyper co" and insert -- HyperText --, therefor.

Signed and Sealed this
Twenty-third Day of December, 2025

John A. Squires
*Director of the United States Patent and Trademark Office*